(12) United States Patent
Kizhakkepat et al.

(10) Patent No.: US 10,507,912 B2
(45) Date of Patent: Dec. 17, 2019

(54) INBOARD BEARING ASSEMBLIES WITH IMPROVED ACCESSIBILITY

(71) Applicant: Bell Helicopter Textron Inc., Fort Worth, TX (US)

(72) Inventors: Amarjit Olenchery Kizhakkepat, Fort Worth, TX (US); Michael Christopher Burnett, Fort Worth, TX (US); Michael Dean Dearman, Weatherford, TX (US)

(73) Assignee: Bell Textron Inc., Fort Worth, TX (US)

( * ) Notice: Subject to any disclaimer, the term of this patent is extended or adjusted under 35 U.S.C. 154(b) by 47 days.

(21) Appl. No.: 15/990,622

(22) Filed: May 26, 2018

(65) Prior Publication Data

US 2019/0016455 A1 Jan. 17, 2019

Related U.S. Application Data

(63) Continuation-in-part of application No. 15/648,650, filed on Jul. 13, 2017.

(51) Int. Cl.

| | |
|---|---|
| *B64C 27/35* | (2006.01) |
| *B64C 29/00* | (2006.01) |
| *B64C 11/06* | (2006.01) |
| *F16C 33/06* | (2006.01) |
| *F16C 17/10* | (2006.01) |

(52) U.S. Cl.
CPC .......... *B64C 29/0033* (2013.01); *B64C 11/06* (2013.01); *F16C 17/10* (2013.01); *F16C 33/06* (2013.01); *F16C 2326/43* (2013.01)

(58) Field of Classification Search
CPC .......... B64C 27/35; B64C 27/54; B64C 27/51
See application file for complete search history.

(56) References Cited

U.S. PATENT DOCUMENTS

| | | | |
|---|---|---|---|
| 4,028,002 A * | 6/1977 | Finney ................... | B64C 27/35 416/134 A |
| 4,257,739 A * | 3/1981 | Covington .............. | B64C 27/35 416/134 A |
| 4,430,045 A * | 2/1984 | Cresap ................... | B64C 27/001 244/17.27 |
| 5,186,686 A | 2/1993 | Staples et al. | |
| 5,316,442 A * | 5/1994 | Mouille .................. | B64C 27/35 416/134 A |

(Continued)

*Primary Examiner* — Brian M O'Hara
(74) *Attorney, Agent, or Firm* — Lawrence Youst PLLC

(57) ABSTRACT

A proprotor system for a tiltrotor aircraft includes a yoke having a plurality of blade arms each having an inboard pocket. Each of a plurality of bearing assemblies is disposed at least partially within one of the inboard pockets. Each of a plurality of inboard beams is disposed at least partially between a centrifugal force bearing and a shear bearing of each bearing assembly and has a proprotor blade coupled thereto. Each of a plurality of latch assemblies selectively couples one of the bearing assemblies to the yoke. Each latch assembly is rotatable relative to the yoke between an engaged position wherein the latch assembly is engagable with one of the bearing assemblies to couple the bearing assembly to the yoke and a disengaged position wherein the latch assembly is disengaged from the respective bearing assembly enabling installation and removal of the respective bearing assembly relative to the respective pocket.

20 Claims, 19 Drawing Sheets

(56) References Cited

U.S. PATENT DOCUMENTS

| | | | |
|---|---|---|---|
| 5,601,408 A | 2/1997 | Hunter et al. | |
| 5,620,305 A | 4/1997 | McArdle | |
| 6,007,298 A | 12/1999 | Karem | |
| 6,296,444 B1 | 10/2001 | Schellhase et al. | |
| 6,641,365 B2 | 11/2003 | Karem | |
| 8,226,355 B2 | 7/2012 | Stamps et al. | |
| 8,231,346 B2 * | 7/2012 | Stamps | F16F 1/40 416/134 A |
| 9,090,344 B2 * | 7/2015 | Stucki | B64C 27/48 |
| 9,126,680 B2 | 9/2015 | Stamps et al. | |
| 9,254,915 B2 | 2/2016 | Stamps | |
| 9,656,747 B2 * | 5/2017 | Shundo | B64C 11/02 |
| 2013/0105637 A1 | 5/2013 | Stamps et al. | |
| 2014/0248150 A1 | 9/2014 | Sutton et al. | |

* cited by examiner

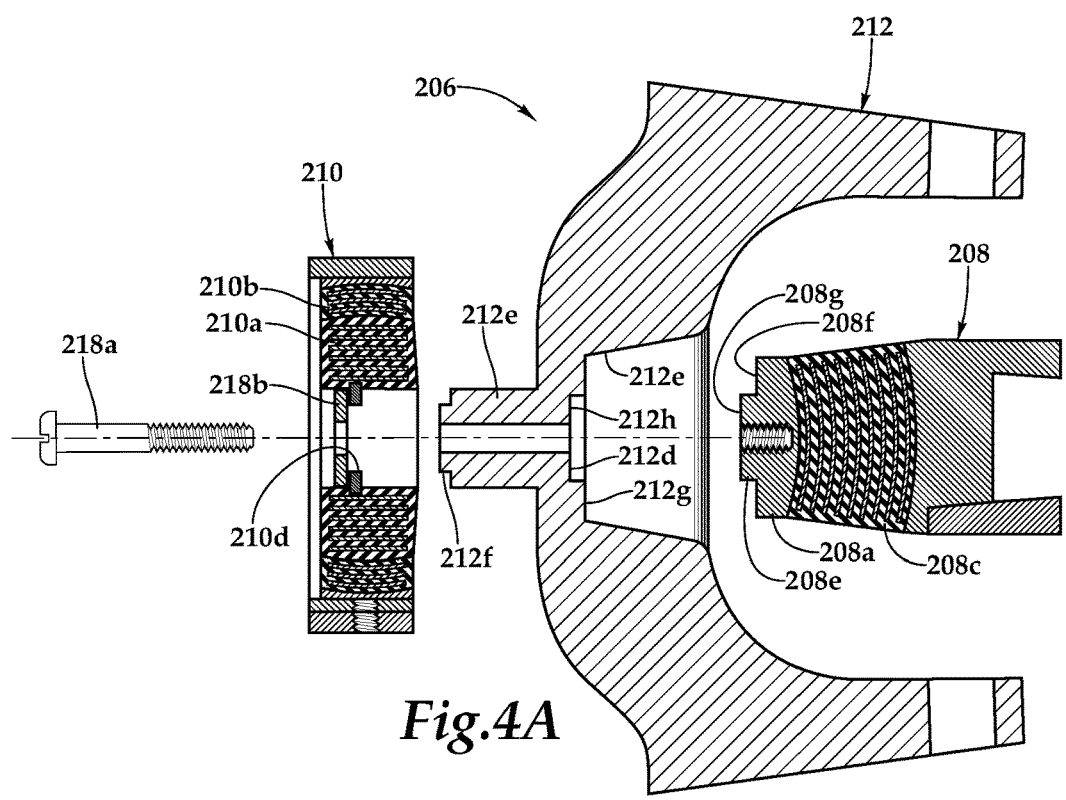
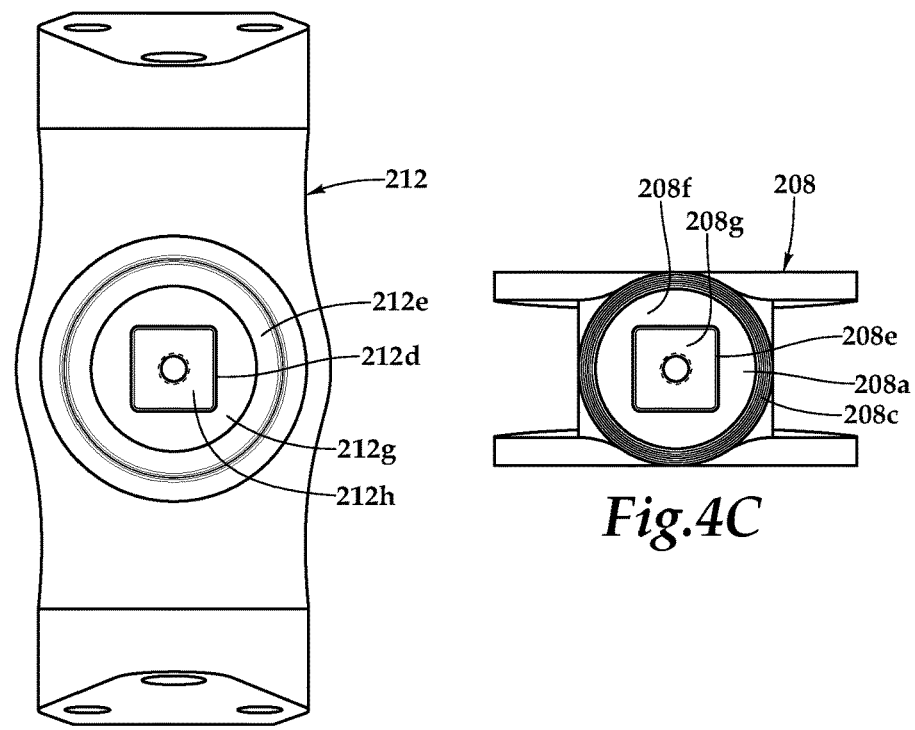
Fig.4A
Fig.4B
Fig.4C

INBOARD BEARING ASSEMBLIES WITH IMPROVED ACCESSIBILITY

CROSS-REFERENCE TO RELATED APPLICATIONS

This is a continuation-in-part of co-pending application Ser. No. 15/648,650 filed Jul. 13, 2017, the entire contents of which is hereby incorporated by reference.

TECHNICAL FIELD OF THE DISCLOSURE

The present disclosure relates, in general, to proprotor systems operable for use on tiltrotor aircraft having a helicopter flight mode and an airplane flight mode and, in particular, to bearing assemblies with improved accessibility that are disposed in inboard pockets of a yoke for use in stiff-in-plane proprotor systems.

BACKGROUND

Tiltrotor aircraft typically include multiple propulsion assemblies that are positioned near outboard ends of a fixed wing. Each propulsion assembly may include an engine and transmission that provide torque and rotational energy to a drive shaft that rotates a proprotor system including a hub assembly and a plurality of proprotor blades. Typically, at least a portion of each propulsion assembly is rotatable relative to the fixed wing such that the proprotor blades have a generally horizontal plane of rotation providing vertical lift for takeoff, hovering and landing, much like a conventional helicopter, and a generally vertical plane of rotation providing forward thrust for cruising in forward flight with the fixed wing providing lift, much like a conventional propeller driven airplane. In addition, tiltrotor aircraft can be operated in configurations between the helicopter flight mode and the airplane flight mode, which may be referred to as conversion flight mode.

Physical structures have natural frequencies of vibration that can be excited by forces applied thereto as a result of operating parameters and/or environmental conditions. These frequencies are determined, at least in part, by the materials and geometrical dimensions of the structures. In the case of tiltrotor aircraft, certain structures having critical natural frequencies include the fuselage, the fixed wing and various elements of the propulsion assemblies. One important operating parameter of a tiltrotor aircraft is the angular velocity or revolutions per minute (RPM) of the proprotor blades, which may generate excitation frequencies corresponding to 1/rev (1 per revolution), 2/rev, 3/rev, etc. In general, proprotor systems for tiltrotor aircraft should be designed to achieve blade flap or out-of-plane frequencies and lead-lag or in-plane frequencies that are sufficiently distant from these excitation frequencies. For example, certain tiltrotor aircraft have stiff-in-plane proprotor systems with the lead-lag frequency above 1.0/rev, such as between 1.4/rev and 1.6/rev. For each proprotor blade, such stiff-in-plane proprotor systems have utilized three independent shear bearings in series and a centrifugal force bearing positioned outboard of the yoke and within the proprotor blade. It has been found, however, that this design prevents heat dissipation from the centrifugal force bearings during operations. In addition, this design precludes visual inspection of the centrifugal force bearings without blade removal. Further, this design obstructs compact blade fold options that can reduce the overall tiltrotor aircraft footprint during storage.

SUMMARY

In a first aspect, the present disclosure is directed to a proprotor system for a tiltrotor aircraft having a helicopter flight mode and an airplane flight mode. The proprotor system includes a yoke having a plurality of blade arms each having an inboard pocket. Each of a plurality of bearing assemblies is disposed at least partially within one of the inboard pockets with each bearing assembly including a centrifugal force bearing and a shear bearing. Each of a plurality of inboard beams is disposed at least partially between one of the centrifugal force bearings and one of the shear bearings. Each of a plurality of proprotor blades is coupled to one of the inboard beams. Each of a plurality of latch assemblies selectively couples one of the bearing assemblies to the yoke with the latch assemblies rotatable relative to the yoke between engaged and disengaged positions. In the engaged position, each latch assembly is engagable with one of the bearing assemblies to couple the respective bearing assembly to the yoke. In the disengaged position, each latch assembly is disengaged from the respective bearing assembly enabling installation and removal of the respective bearing assembly relative to the respective pocket.

In some embodiments, the yoke may have first and second surfaces and each blade arm may define a pair of hub bolt openings passing through the yoke inboard of the inboard pocket. Each of a plurality of flanges may be coupled to one of the shear bearings, may have a contact relationship with the first surface of the yoke and may include a pair of bearing bolt openings. Each of the latch assemblies may include a clamp plate coupled to the second surface of the yoke and a pair of cam latches coupled to and rotatable relative to the first surface of the yoke. In the engaged position, respective cam latches and clamp plates are coupled to respective flanges. In certain embodiments, each clamp plate may have a pair of hub bolt openings and a pair of bearing bolt openings, each flange may have a pair of bearing bolt openings and each cam latch may have a hub bolt opening and a bearing bolt opening. In such embodiments, a plurality of hub bolts may pass through aligned hub bolt openings of respective cam latches, the yoke and respective clamp plates to couple the latch assemblies to the yoke. Also, in such embodiments, each cam latch may be rotatable about the respective hub bolt between the engaged and disengaged positions enabling installation and removal of the respective bearing assembly relative to the respective pocket without removal of the respective hub bolts when the respective latch assembly is in the disengaged position. In some embodiments, a plurality of bearing bolts may pass through aligned bearing bolt openings of respective cam latches, respective flanges and respective clamp plates to couple the bearing assemblies to the yoke when the latch assemblies are in the engaged position.

In certain embodiments, the centrifugal force bearing of each bearing assembly may be positioned outboard of the shear bearing. In some embodiments, the centrifugal force bearings may have a series of spherical elastomeric layers separated by inelastic shims. In certain embodiments, the shear bearing may include a radially inwardly disposed journal bearing coupled to the inboard beam and a radially outwardly disposed spherical bearing providing a tilting degree of freedom for the inboard beam relative to the yoke. In some embodiments, the yoke may have at least three blade arms.

In a second aspect, the present disclosure is directed to a proprotor system for a tiltrotor aircraft having a helicopter flight mode and an airplane flight mode. The proprotor system includes a yoke having a plurality of blade arms each having an inboard pocket. Each of a plurality of hub bolts extends through the yoke inboard of the inboard pockets. Each of a plurality of bearing assemblies is disposed at least partially within one of the inboard pockets with each bearing assembly including a centrifugal force bearing and a shear bearing having a flange. Each of a plurality of inboard beams is disposed at least partially between one of the centrifugal force bearings and one of the shear bearings. Each of a plurality of proprotor blades is coupled to one of the inboard beams. Each of a plurality of latch assemblies includes a clamp plate coupled to a first side of the yoke and a pair of cam latches coupled to a second side yoke by respective hub bolts with each cam latch selectively rotatable relative to the yoke about the respective hub bolt between engaged and disengaged positions. In the engaged position, each cam latch is coupled to the flange of one of the shear bearings and the respective clamp plate to couple the respective bearing assembly to the yoke. In the disengaged position, each cam latch is uncoupled from the respective flange and the respective clamp plate enabling installation and removal of the respective bearing assembly relative to the respective pocket without removal of the respective hub bolts.

In a third aspect, the present disclosure is directed to a tiltrotor aircraft having a helicopter flight mode and an airplane flight mode. The tiltrotor aircraft includes a fuselage, a wing extending from the fuselage and first and second pylon assemblies coupled to the wing outboard of the fuselage. First and second proprotor systems are operably associated respectively with the first and second pylon assemblies with each proprotor system including a yoke having a plurality of blade arms each having an inboard pocket. Each of a plurality of bearing assemblies is disposed at least partially within one of the inboard pockets with each bearing assembly including a centrifugal force bearing and a shear bearing. Each of a plurality of inboard beams is disposed at least partially between one of the centrifugal force bearings and one of the shear bearings. Each of a plurality of proprotor blades is coupled to one of the inboard beams. Each of a plurality of latch assemblies selectively couples one of the bearing assemblies to the yoke with the latch assemblies rotatable relative to the yoke between engaged and disengaged positions. In the engaged position, each latch assembly is engagable with one of the bearing assemblies to couple the respective bearing assembly to the yoke. In the disengaged position, each latch assembly is disengaged from the respective bearing assembly enabling installation and removal of the respective bearing assembly relative to the respective pocket.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 4A-4C are various views of a bearing assembly and component parts thereof for a proprotor system in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1A:
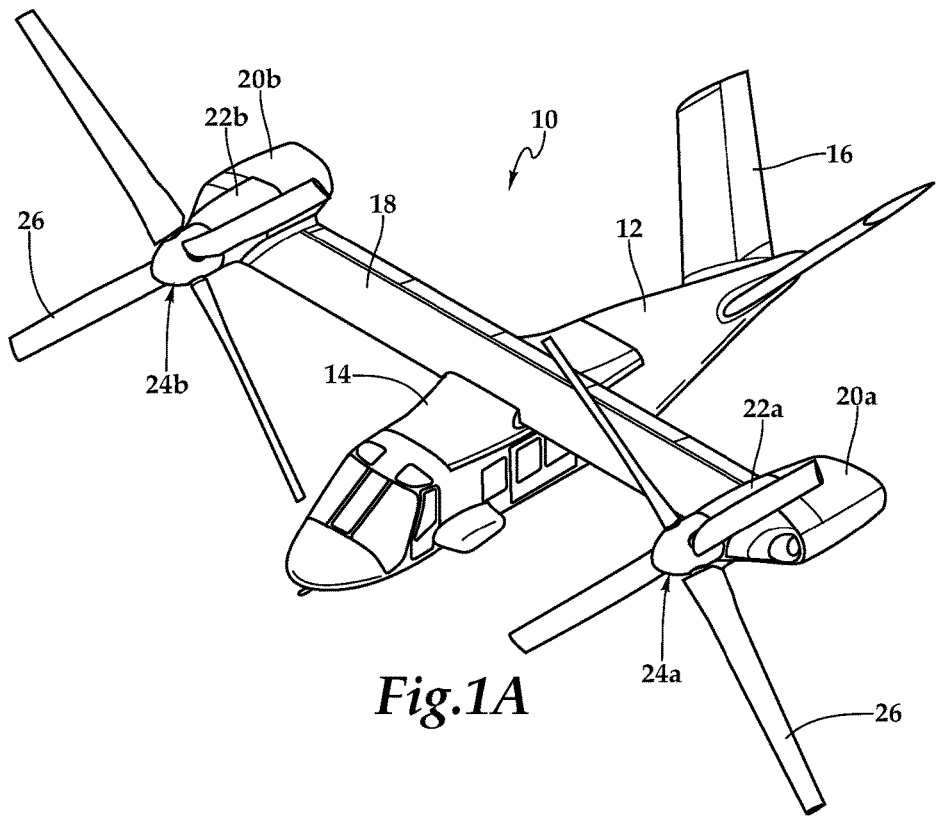
FIGS. 1A-1B are schematic illustrations of a tiltrotor aircraft in an airplane flight mode and a helicopter flight mode, respectively, in accordance with embodiments of the present disclosure.
Figure 1B:
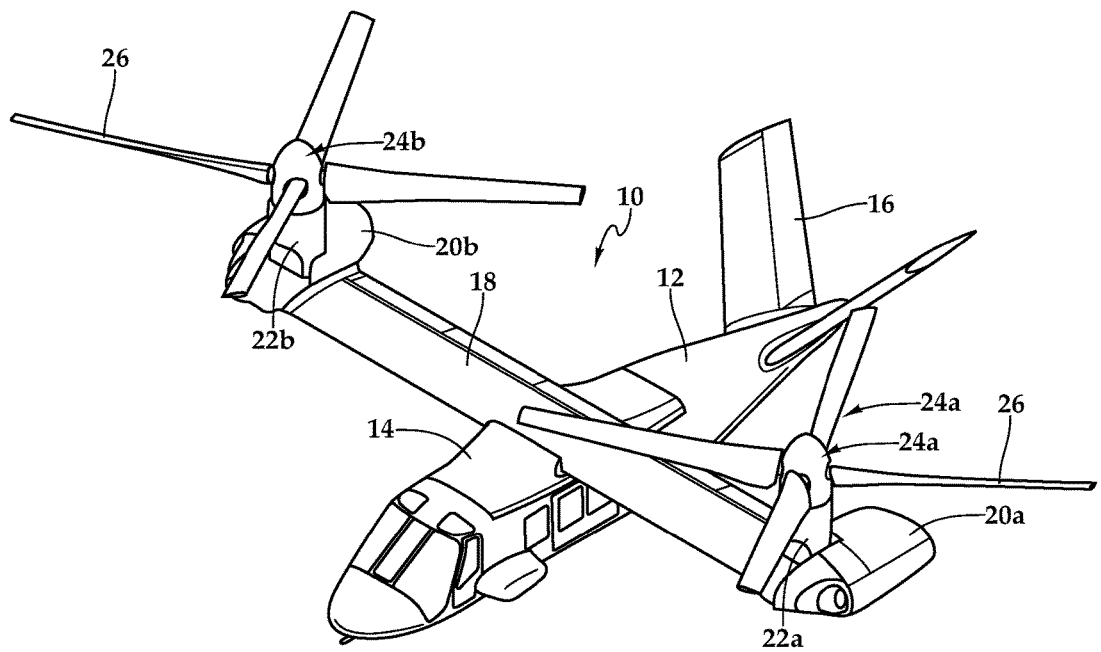

Referring to FIGS. 1A and 1B in the drawings, a tiltrotor aircraft is schematically illustrated and generally designated 10. Aircraft 10 includes a fuselage 12, a wing mount assembly 14 that is rotatable relative to fuselage 12 and a tail assembly 16 having control surfaces operable for horizontal and/or vertical stabilization during forward flight. A wing 18 is supported by wing mount assembly 14 and rotates with wing mount assembly 14 relative to fuselage 12 to enable tiltrotor aircraft 10 to convert to a storage configuration. Together, fuselage 12, tail assembly 16 and wing 18 as well as their various frames, longerons, stringers, bulkheads, spars, ribs, skins and the like may be considered to be the airframe of tiltrotor aircraft 10.

Located proximate the outboard ends of wing 18 are fixed nacelles 20a, 20b, each of which may house a drive system including an engine and a fixed portion of a transmission. A pylon assembly 22a is rotatable relative to fixed nacelle 20a and wing 18 between a generally horizontal orientation, as best seen in FIG. 1A, a generally vertical orientation, as best seen in FIG. 1B. Pylon assembly 22a may include a tilting portion of the transmission and a proprotor system 24a that is rotatable responsive to torque and rotational energy provided via the drive system. Likewise, a pylon assembly 22b is rotatable relative to fixed nacelle 20b and wing 18 between a generally vertical orientation, as best seen in FIG. 1A, a generally horizontal orientation, as best seen in FIG. 1B. Pylon assembly 22b may include a tilting portion of the transmission and a proprotor system 24b that is rotatable responsive to torque and rotational energy provided via the drive system. In the illustrated embodiment, proprotor systems 24a, 24b each include four proprotor blades 26. It should be understood by those having ordinary skill in the art, however, that proprotor assemblies 24a, 24b could alternatively have a different number of proprotor blades, either less than or greater than four. In addition, it should be understood that the position of pylon assemblies 22a, 22b, the angular velocity or revolutions per minute (RPM) of the proprotor systems 24a, 24b, the pitch of proprotor blades 26 and the like are controlled by the pilot of tiltrotor aircraft 10 and/or the flight control system to selectively control the direction, thrust and lift of tiltrotor aircraft 10 during flight.

FIG. 1A illustrates tiltrotor aircraft 10 in a forward flight mode or airplane flight mode, in which proprotor systems 24a, 24b are positioned to rotate in a substantially vertical plane to provide a forward thrust while a lifting force is supplied by wing 18 such that tiltrotor aircraft 10 flies much like a conventional propeller driven aircraft. FIG. 1B illustrates tiltrotor aircraft 10 in a vertical takeoff and landing (VTOL) flight mode or helicopter flight mode, in which proprotor systems 24a, 24b are positioned to rotate in a substantially horizontal plane to provide a vertical lift such that tiltrotor aircraft 10 flies much like a conventional helicopter. During operation, tiltrotor aircraft 10 may convert from helicopter flight mode to airplane flight mode following vertical takeoff and may convert back to helicopter flight mode from airplane flight mode for hover and vertical landing. In addition, tiltrotor aircraft 10 can perform certain flight maneuvers with proprotor systems 24a, 24b positioned between airplane flight mode and helicopter flight mode, which can be referred to as conversion flight mode.

Each fixed nacelle 20a, 20b may house a drive system including an engine and transmission for supplying torque and rotational energy to a respective proprotor system 24a, 24b. In such embodiments, the drive systems of each fixed nacelle 20a, 20b may be coupled together via one or more drive shafts located in wing 18 such that either drive system can serve as a backup to the other drive system in the event of a failure. Alternatively or additionally, a drive system including an engine and transmission may be located in fuselage 12 for providing torque and rotational energy to both proprotor systems 24a, 24b via one or more drive shafts located in wing 18. In tiltrotor aircraft having drive systems in both the nacelles and the fuselage, the fuselage mounted drive system may serve as a backup in the event of failure of either or both of the nacelle mounted drive systems.

In general, proprotor systems for tiltrotor aircraft should be designed to achieve blade flap or out-of-plane frequencies and lead-lag or in-plane frequencies that are sufficiently distant from the excitation frequencies generated by the proprotor systems corresponding to 1/rev (1 per revolution), 2/rev, 3/rev, etc. As an example, if a proprotor system has an operating speed of 360 RPM, the corresponding 1/rev excitation frequency is 6 Hertz (360/60=6 Hz). Similarly, the corresponding 2/rev excitation frequency is 12 Hz and the corresponding 3/rev excitation frequency is 18 Hz. It should be understood by those having ordinary skill in the art that a change in the operating speed of a proprotor system will result in a proportional change in the excitation frequencies generated by the proprotor system. For tiltrotor aircraft, operating in airplane flight mode typically requires less thrust than operating in helicopter flight mode. One way to reduce thrust as well as increase endurance, reduce noise levels and reduce fuel consumption is to reduce the operating speed of the proprotor systems. For example, in helicopter flight mode, the tiltrotor aircraft may operate at 100 percent of design RPM, but in airplane flight mode, the tiltrotor aircraft may operate at a reduced percent of design RPM such as between about 80 percent and about 90 percent of design RPM. Thus, to achieve desirable rotor dynamics, the proprotor systems for tiltrotor aircraft should be designed to avoid the frequencies of 1/rev, 2/rev, 3/rev, etc. for both helicopter flight mode and airplane flight mode operations.

In the illustrated embodiment, each proprotor system 24a, 24b includes four proprotor blades 26 that are positioned circumferentially about a hub assembly at ninety-degree intervals. Proprotor blades 26 and the hub assembly are preferably designed to have sufficient stiffness to achieve a first-in-plane frequency above 1.0/rev. In some embodiments, the first in-plane frequency of proprotor blades 26 may preferably be in a range between about 1.2/rev and about 1.8/rev and more preferably in a range between about 1.4/rev and about 1.6/rev. As another example, proprotor blades 26 and the hub assembly may be designed to have sufficient stiffness to achieve a first-in-plane frequency above 2.0/rev. For example, the first in-plane frequency of proprotor blades 26 may be in a range between about 2.0/rev and about 3.0/rev. In such embodiments, the first in-plane frequency of proprotor blades 26 may preferably be in a range between about 2.2/rev and about 2.8/rev and more preferably in a range between about 2.4/rev and about 2.6/rev.

The desired proprotor blade stiffness and/or stiffness to mass ratio of the present embodiments is achieved using, for example, carbon-based materials for the structural components of proprotor blades 26 such as graphite-based materials, graphene-based materials or other carbon allotropes including carbon nanostructure-based materials such as materials including single-walled and multi-walled carbon nanotubes. In one example, the spar and/or skin of proprotor blades 26 are preferably monolithic structures formed using a broad goods and/or layered tape construction process having a manual or automated layup of a plurality of composite broad goods material layers including carbon fabrics, carbon tapes and combinations thereof, positioned over one or more mandrels having simple geometric surfaces with smooth transitions. After curing and other processing steps, the material layers form a high strength, lightweight solid composite members. In this process, the material thicknesses of the components can be tailoring spanwise and chordwise to the desired stiffness and/or stiffness to mass ratio. The proprotor blade components may be composed of up to about 50 percent, about 60 percent, about 70 percent, about 80 percent, about 90 percent or more of the carbon-based material or materials.

Figure 2A:
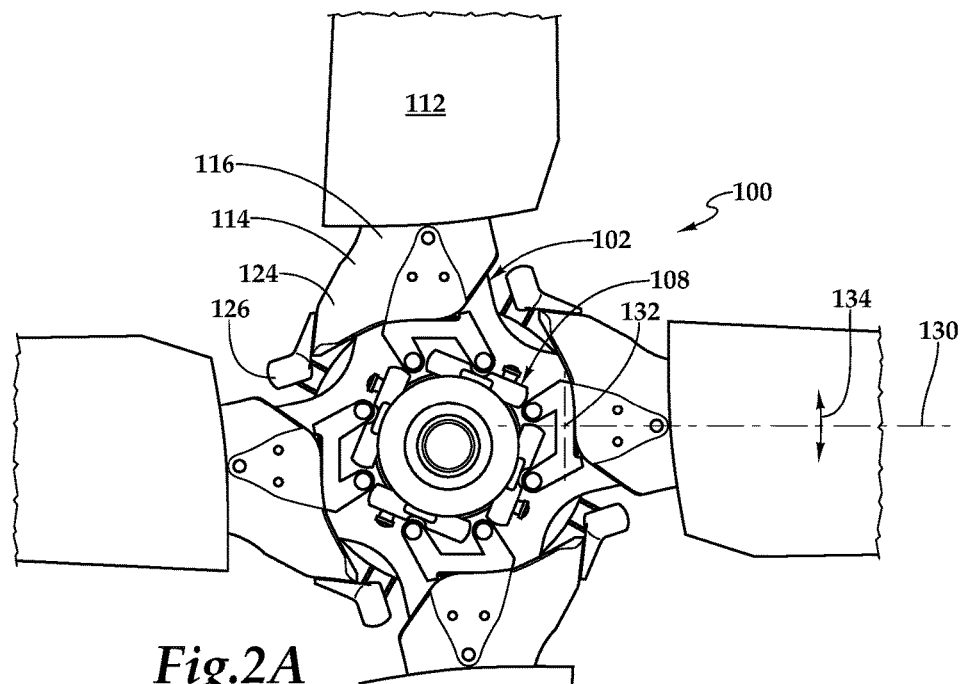
FIGS. 2A-2D are various views of a proprotor system having bearing assemblies disposed in inboard pockets of a yoke in accordance with embodiments of the present disclosure.
Figure 2B:
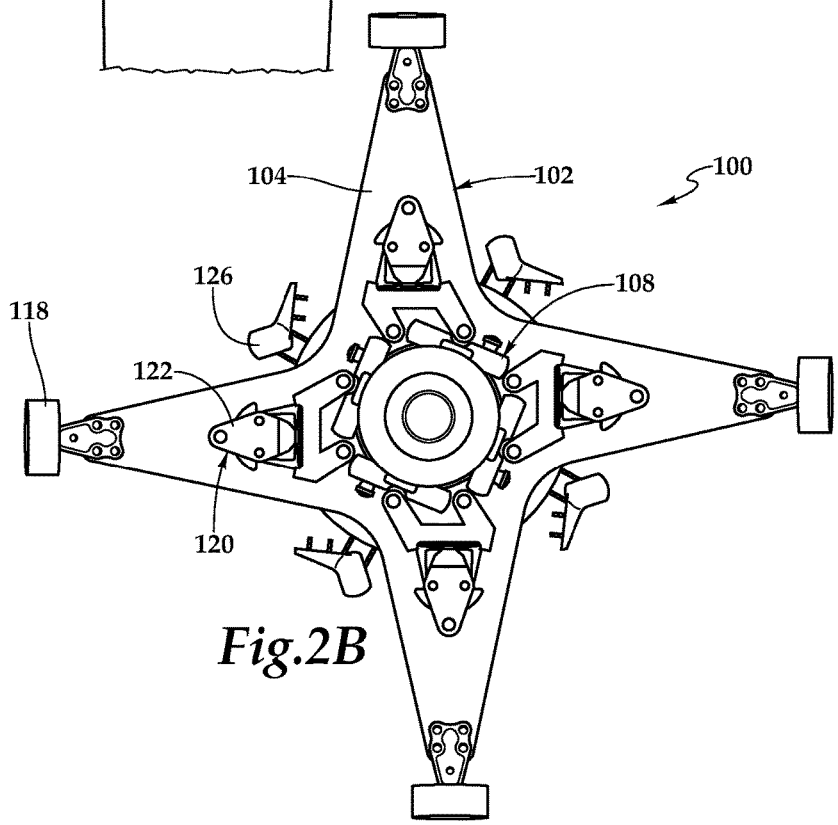
Figure 2C:
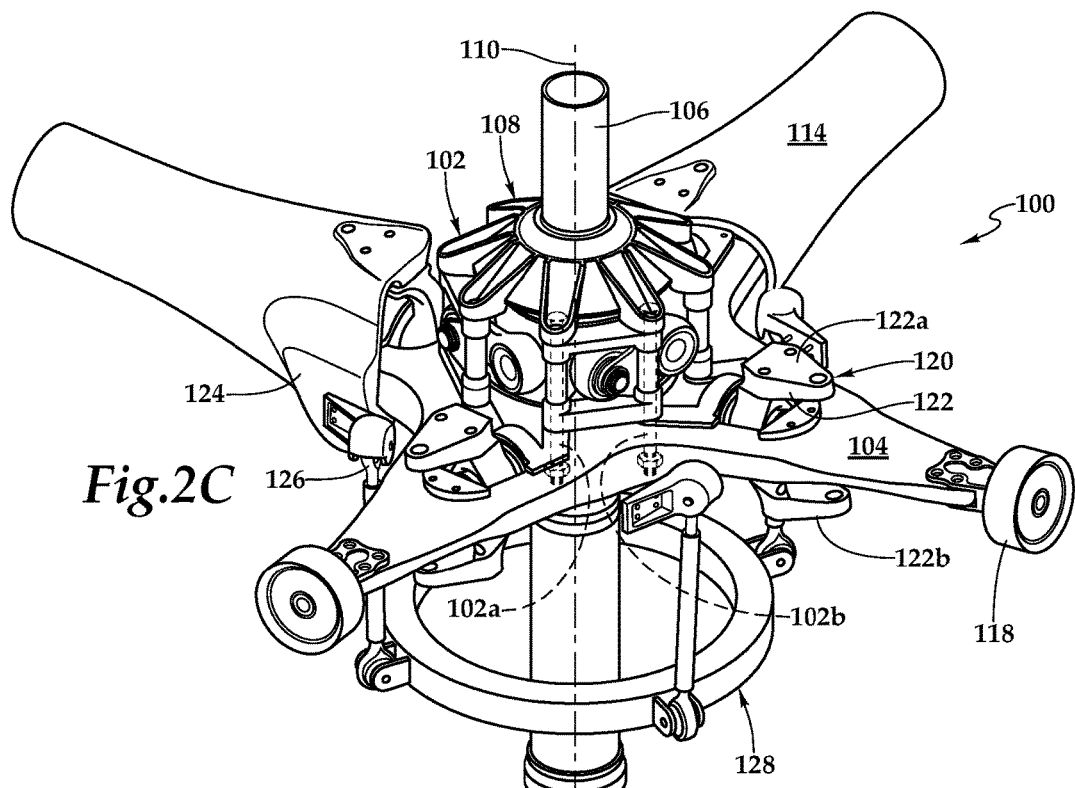
Figure 2D:
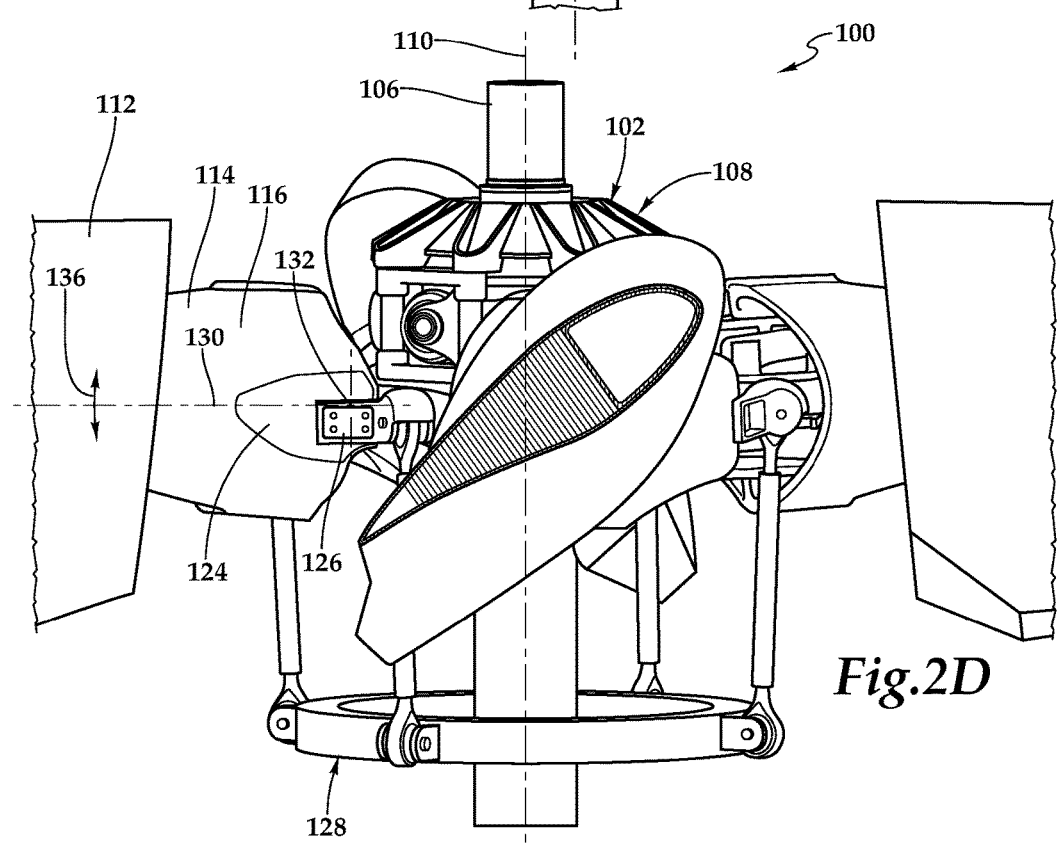

Referring next to FIGS. 2A-2D in the drawings, a proprotor system for tiltrotor aircraft is depicted and generally designated 100. In the illustrated embodiment, proprotor system 100 includes a hub assembly 102 including a yoke 104 that is coupled to a mast 106 via a constant velocity joint assembly 108. Hub assembly 102 rotates with mast 106, which is coupled to a drive system including an engine and transmission of the tiltrotor aircraft that provides torque and rotational energy to proprotor system 100. Constant velocity joint assembly 108 provides a gimballing degree of freedom for yoke 104 relative to mast 106 enabling yoke 104 to teeter in any direction relative to the rotational axis 110 of proprotor system 100. Accordingly, hub assembly 102 may be referred to as a gimbaled hub. In the illustrated implementation, constant velocity joint assembly 108 is positioned above the rotational plane of yoke 104 and is mounted on and/or coupled to an upper surface of yoke 104 using a plurality of hub bolts, such as hub bolts 102a, 102b, that pass through hub bolt openings of constant velocity joint assembly 108 and yoke 104, as best seen in FIG. 2C. As illustrated, yoke 104 includes four blade arms each of which holds and supports a proprotor blade 112. Each proprotor blade 112 includes a spar 114 that extends spanwise toward the tip of proprotor blade 112. Spars 114 are preferably the main structural members of proprotor blades 112 designed to carry the primary centrifugal and bending loads of proprotor blades 112. Spars 114 may have a root-to-tip twist on the order of about 30 degrees to about 40 degrees or other suitable root-to-tip twist.

Each spar 114 has a root section 116 that couples of each proprotor blade 112 with yoke 104 via an outboard shear bearing 118 and an inboard bearing assembly 120. Each shear bearing assembly 118 is coupled to an outboard end of yoke 104 with a plurality of connecting members such as bolts, pins or the like. Likewise, each bearing assembly 120 is coupled to an inboard station of yoke 104 with a plurality of connecting members such as bolts, including the hub bolts, pins or the like. Each bearing assembly 120 includes a rotatably mounted inboard beam 122 having upper and lower arms 122a, 122b. As illustrated, each spar 114 is coupled to a respective inboard beam 122 at upper and lower arms 122a, 122b with a plurality of connecting members such as bolts, pins or the like. In addition, each spar 114 is coupled to a respective shear bearing assembly 118 via a suitable connection (not visible).

Each proprotor blade 112 has a centrifugal force retention load path through bearing assembly 120 to yoke 104. In the illustrated embodiment, each spar 114 includes an integral pitch horn 124 on the leading edge of spar 114 that is coupled to a leading edge pitch link 126 of a pitch control assembly 128 depicted as the rotating portion of a rise and fall swash plate operable to collectively and cyclically control the pitch of proprotor blades 112. In other embodiments, the pitch horns may be independent components coupled to the spars, the pitch horns may be trailing edge pitch horns and/or the pitch links may be trailing edge pitch links. Each proprotor blade 112 has an independent pitch change degree of freedom relative to hub assembly 102 about a pitch change axis 130. The pitch change of each proprotor blade 112 is controlled responsive to changes in position of pitch links 126 and pitch control assembly 128. Rotation of each proprotor blade 112 causes the respective inboard beam 122 to rotate relative to yoke 104 about the respective pitch change axis 130. Each proprotor blade 112 has an independent tilting degree of freedom relative to hub assembly 102 about a focal point 132 that is coincident with pitch change axis 130. For example, each proprotor blade 112 is operable to tilt relative to hub assembly 102 with lead-lag motion, as indicated by arrow 134 in FIG. 2A, and with flapping motion, as indicated by arrow 136 in FIG. 2D.

Referring additionally to FIGS. 3A-3E in the drawings, therein are depicted various views of a proprotor system 200 of the present disclosure. Proprotor system 200 includes a yoke 202 depicted as having three blade arms each including an inboard pocket 204. As discussed herein, a yoke of the present disclosure could have any number of blade arms corresponding to the desired number of proprotor blades in a particular implementation including yoke designs having at least three blade arms, at least four blade arms or other suitable number of blade arms. Yoke 202 may be formed from composite materials including numerous material plies composed of continuous filaments, fibers and/or sheets. The composite materials may include one or more of carbon, graphite, glass, basalt, aromatic polyamide materials or the like and any combination thereof. The material plies may be in the form of fabrics such as woven fabrics, tape such as unidirectional tape and the like. The plies may be joined together with a resin such as a polymeric matrix including thermoplastic or thermosetting resin or any suitable resin system such as epoxies, polyimides, polyamides, bismaleimides, polyesters, vinyl esters, phenolics, polyetheretherketones (PEEK), polyetherketones (PEK), polyphenylene sulfides (PPS) and the like. After curing, yoke 202 may require a variety of finishing steps including material removal processes such as machining operations to shape the surface of yoke 202 and to form inboard pockets 204 as well as other openings, such as hub bolt openings, in yoke 202.

A bearing assembly 206 is disposed in each of the inboard pockets 204 of yoke 202, for clarity of illustration, only one such bearing assembly 206 is shown in FIGS. 3A-3E. Bearing assembly 206 includes a centrifugal force bearing 208, a shear bearing 210 and an inboard beam 212. In the illustrated embodiment, centrifugal force bearing 208 includes an inboard member 208a having a convex spherical outboard surface and an outboard member depicted as integral shoe 208b having a concave spherical inboard surface. Disposed between inboard member 208a and outboard member 208b is a bearing element 208c that includes a series of spherical elastomeric layers separated by inelastic shims. The connections within bearing element 208c and between bearing element 208c and inboard member 208a and outboard member 208b are permanent and may be made by vulcanizing the elastomeric material of bearing element 208c to the adjacent surfaces or by bonded, adhered or otherwise secured the elastomeric material in a non-removable manner to these surfaces. The durometer and thickness of the materials as well as the stiffness, softness and/or spring rate of centrifugal force bearing 208 may be tailored to achieve the desired operational modes based upon the loads and motions expected in the particular application. In operation, each centrifugal force bearing 208 is operable to provide a centrifugal force retention load path from a proprotor blade 112 to yoke 202. In the illustrated embodiment, centrifugal force bearing 208 includes a lower clamp plate 208d that is bolted, pinned or otherwise coupled to a lower surface of outboard member 208b once centrifugal force bearing 208 is disposed in an inboard pocket 204. Centrifugal force bearing 208 is coupled to yoke 202 outboard of inboard pocket 204 using bolts 224 or other suitable technique.

Figure 3A:
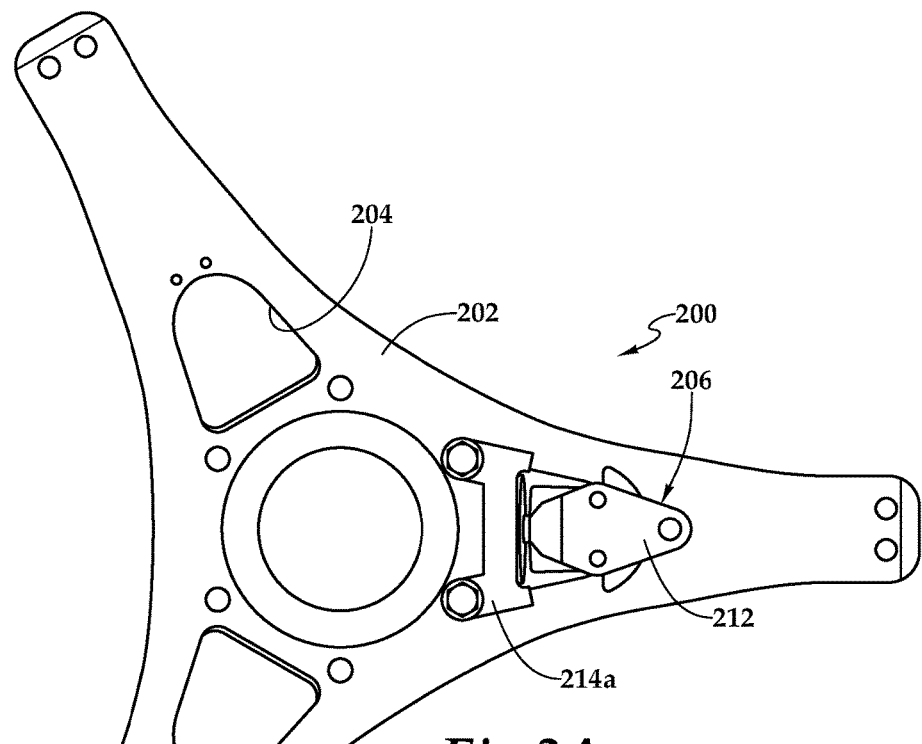
FIGS. 3A-3D are various views of a bearing assembly disposed in an inboard pocket of a yoke for a proprotor system in accordance with embodiments of the present disclosure.
Figure 3B:
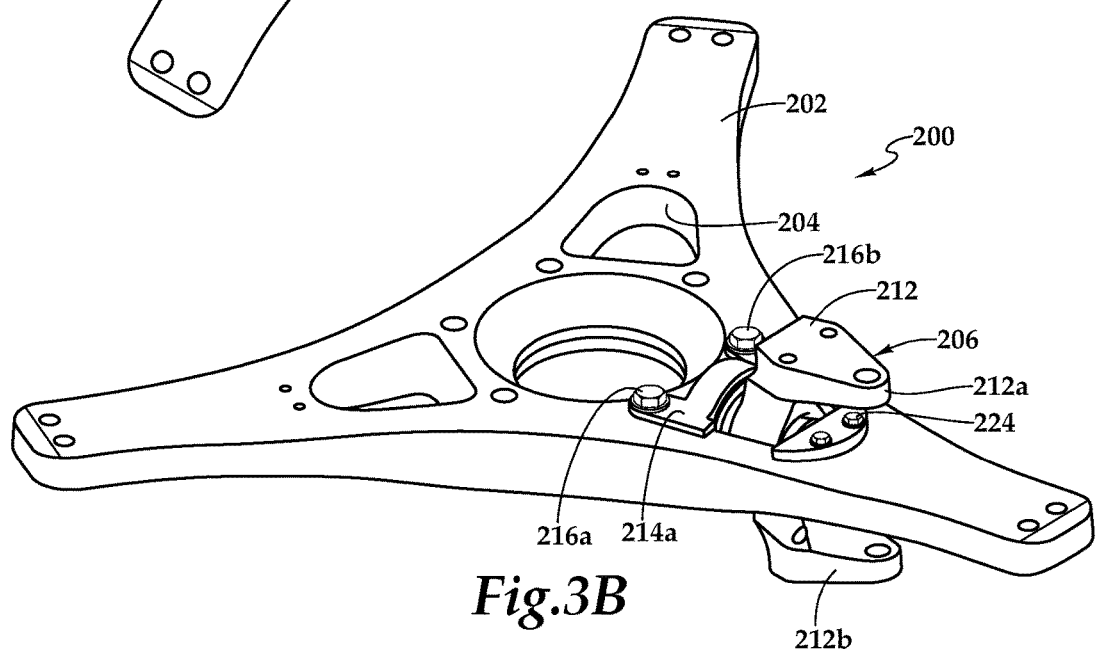
Figure 3C:
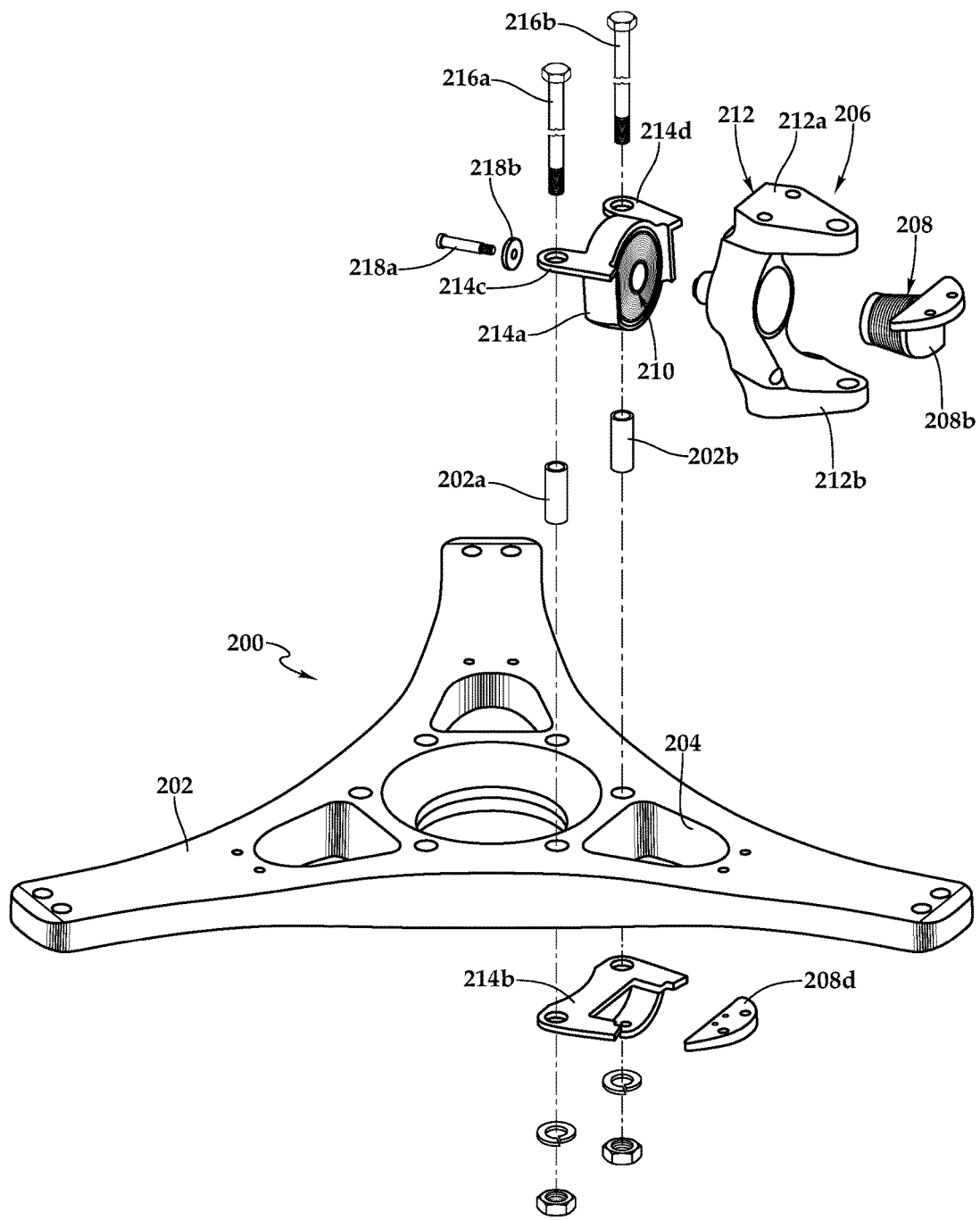
Figure 3D:
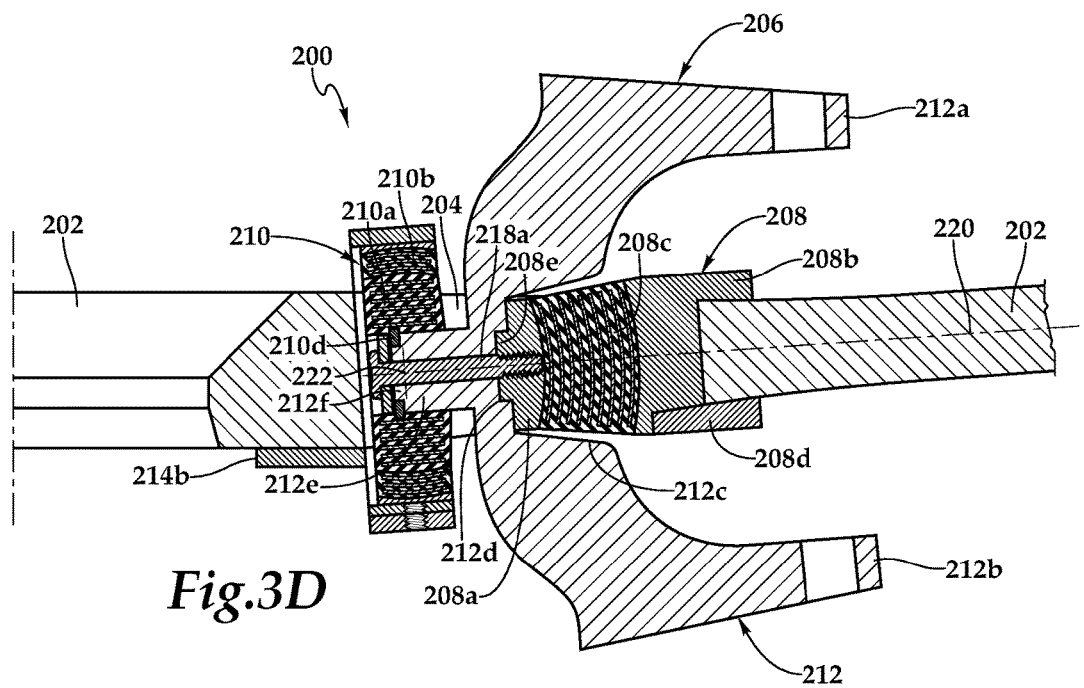

In the illustrated embodiment, shear bearing 210 includes a radially inwardly disposed journal bearing 210a and a radially outwardly disposed spherical bearing 210b. Journal bearing 210a includes a series of cylindrical elastomeric layers separated by inelastic shims. Spherical bearing 210b includes a series of spherical elastomeric layers separated by inelastic shims. The connections within journal bearing 210a and spherical bearing 210b are permanent and may be made by vulcanizing the elastomeric material directly on adjacent surfaces or by bonded, adhered or otherwise secured the elastomeric material in a non-removable manner to these surfaces. The durometer and thickness of the materials as well as the stiffness, softness and/or spring rate of journal bearing 210a and spherical bearing 210b may be tailored to achieve the desired operational modes based upon the loads and motions expected in the particular application. In other embodiments, shear bearing 210 could be a non elastomer bearing or could include a non elastomer journal bearing and/or a non elastomer spherical incorporating, for example, one or more metal bearings. In the illustrated embodiment, shear bearing 210 includes a metal bearing ring 214a that is preferably permanently coupled to spherical bearing 210b by vulcanizing, bonding, adhering or otherwise securing the elastomeric material of spherical bearing 210b to the inner surface of bearing ring 214a. In the illustrated embodiment, bearing ring 214a includes a pair of oppositely disposed flanges 214c, 214d forming an upper clamp plate. Shear bearing 210 is coupled to yoke 202 using hub bolts 216a, 216b that pass through the hub bolt openings in bearing ring 214a, yoke 202 and lower clamp plate 214b. As best seen in FIG. 3C, hub bolts 216a, 216b have been foreshortened for convenience of illustration as hub bolts 216a, 216b would also coupled the constant velocity joint to yoke 202 as discussed herein. In the illustrated embodiment, bushings 202a, 202b, such as metal bushings, are positioned within the hub bolt openings of yoke 202. Bushings 202a, 202b may be bonded or otherwise secured within the hub bolt openings of yoke 202.

In the illustrated embodiment, inboard beam 212 includes upper and lower arms 212a, 212b. Inboard beam 212 receives centrifugal force bearing 208 in an opening 212c such that centrifugal force bearing 208 is housed within inboard beam 212. Centrifugal force bearing 208 includes an anti-rotation feature depicted as a boss 208e extending radially inwardly, relative to yoke 202, from inboard member 208a. Boss 208e is received within an anti-rotation feature depicted as cavity 212d of inboard beam 212 that extends radially inwardly, relative to yoke 202, to couple centrifugal force bearing 208 to inboard beam 212 and prevent relative rotation therebetween. An inboard extension 212e of inboard beam 212 is received in an opening 210c of shear bearing 210. In addition, an anti-rotation feature depicted as a boss 212f of inboard extension 212e is received within an anti-rotation feature 210d of shear bearing 210 to couple shear bearing 210 to inboard beam 212 and prevent relative rotation therebetween. In the illustrated embodiment, centrifugal force bearing 208 and shear bearing 210 are coupled together with a bolt 218a and washer 218b.

Figure 3E:
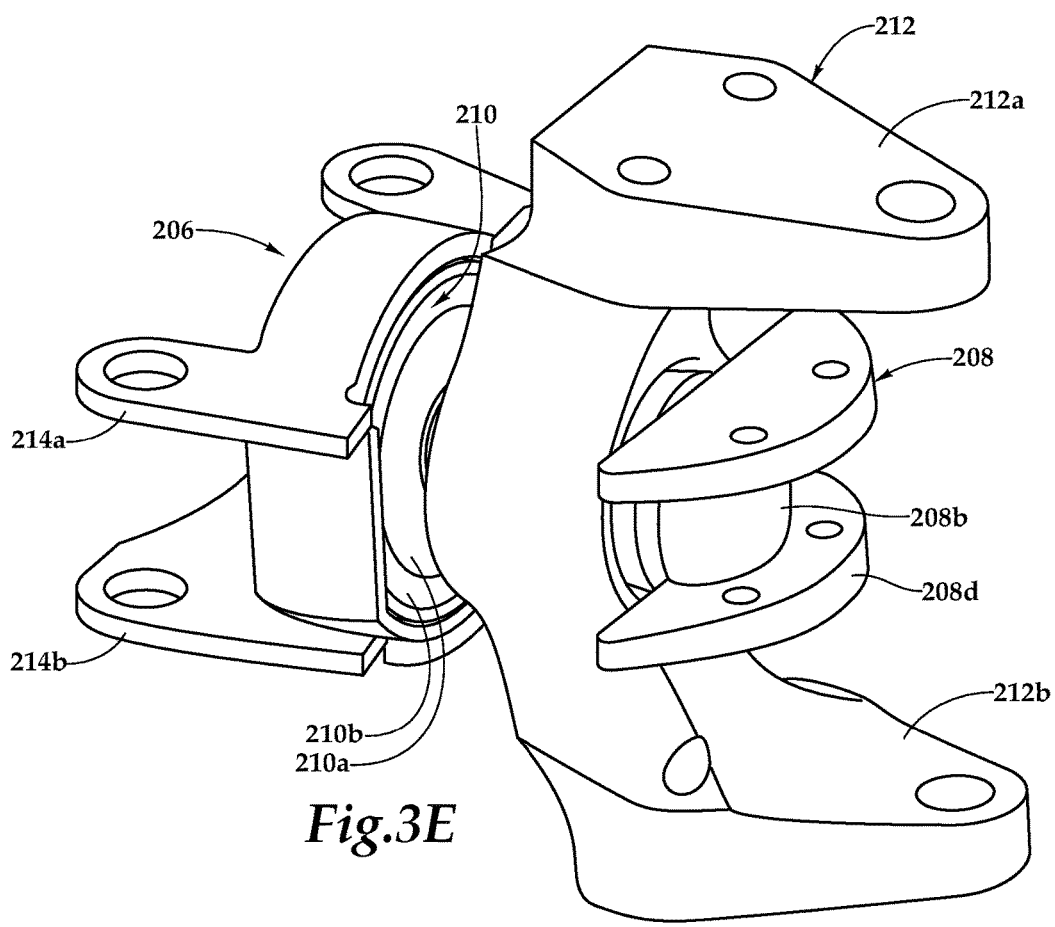
FIG. 3E is an isometric view of a bearing assembly for a proprotor system in accordance with embodiments of the present disclosure.

As best seen in FIG. 3E, to install a bearing assembly 206 in an inboard pocket 204 of yoke 202, clamp plate 214b and lower clamp plate 208d of centrifugal force bearing 208 are removed such that the remainder of bearing assembly 206 may be lowered into an inboard pocket 204. Once bearing assembly 206 is disposed in an inboard pocket 204 lower clamp plate 208d may be coupled to outboard member 208b by bolting or other suitable technique. Outboard member 208b may now be coupled to yoke 202 by bolting or other suitable technique. In addition, clamp plates 214a, 214b are coupled together and clamp plates 214a, 214b are coupled to yoke 202 with hub bolts 216a, 216b that also couple the constant velocity joint assembly to yoke 202 (see for example constant velocity joint assembly 108 of FIG. 2C). These connections secure bearing assembly 206 in inboard pocket 204 of yoke 202.

As discussed herein, a proprotor blade is coupled to upper and lower arms 212a, 212b of inboard beam 212 by bolting or other suitable technique. As the proprotor blades engage in collective and/or cyclic blade pitch operations, inboard beam 212 must rotate therewith about pitch changes axis 220. During these rotary operations, inboard beam 212 causes inboard member 208a of centrifugal force bearing 208 to rotate relative to outboard member 208b due to the anti-rotation connection between inboard beam 212 and inboard member 208a as well as the fixed connection between outboard member 208b and yoke 202. Also, during these rotary operations, inboard beam 212 causes rotation within journal bearing 210a and/or between journal bearing 210a and spherical bearing 210b due to the anti-rotation connection between inboard beam 212 and shear bearing 210 as well as the fixed connection between shear bearing 210 and yoke 202 created by clamp plates 214a, 214b. Thus, a proprotor blade coupled to bearing assembly 206 has a pitch change degree of freedom about pitch change axis 220.

Centrifugal force bearing 208 is positioned outboard of shear bearing 210 and provides a centrifugal force retention path between a proprotor blade and yoke 202. As the proprotor blades engage in blade flap or out-of-plane movements and lead-lag or in-plane movements, spherical bearing 210b enables inboard beam 212 to tilt relative to yoke 202. In the illustrated embodiment, inboard beam 212 is operable to tilt relative to a focal point 222 associated with the spherical elements of spherical bearing 210b, which is preferably coincident with pitch change axis 220. Thus, a proprotor blade coupled to bearing assembly 206 has a tilting degree of freedom about focal point 222.

Use of proprotor systems having the inboard bearing assemblies of the present disclosure reduces the bearing count compared to conventional proprotor systems. The inboard bearing assemblies of the present disclosure also dissipate heat faster than conventional centrifugal force bearings that are disposed outboard of the yoke and within the proprotor blades. In addition, locating the bearing assemblies of the present disclosure in inboard stations enables visual inspection of the bearing assemblies without blade removal. Further, the inboard positioning of the bearing assemblies of the present disclosure allows for compact blade fold options that reduce the tiltrotor aircraft footprint during storage.

Referring to FIGS. 4A-4C, additional features of bearing assembly 206 will be described. The coupling between centrifugal force bearing 208 and inboard beam 212 preferably serves three important functions including providing a centrifugal force load path function, a lateral movement constraint function and an anti-rotation function. During rotary operations of an aircraft using a proprotor system of the present disclosure, the centrifugal force load generated by each proprotor blade is transferred to the yoke by a bearing assembly 206. Within each bearing assembly 206, the centrifugal force load path includes mating surfaces 208f, 208g of centrifugal force bearing 208 and mating surfaces 212g, 212h of inboard beam 212. In the illustrated embodiment, mating surfaces 208f, 208g are generally planar mating surfaces with a radial step therebetween. Likewise, mating surfaces 212g, 212h are generally planar mating surfaces with a radial step therebetween. As illustrated, mating surface 208f of centrifugal force bearing 208 has a contact relationship with corresponding mating surface 212g of inboard beam 212. Similarly, mating surface 208g of centrifugal force bearing 208 has a contact relationship with corresponding mating surface 212h of inboard beam 212. In other embodiments, certain of the mating surfaces or portions thereof could have a spaced apart relationship with a corresponding mating surface. Thus, during rotary operations of an aircraft using a proprotor system of the present disclosure, the centrifugal force load path includes mating surfaces 208f, 208g of centrifugal force bearing 208 and mating surfaces 212g, 212h of inboard beam 212.

In addition to the centrifugal forces that are generally in the radially outward direction relative to yoke 202, the components of bearing assembly 206 also experience lateral forces associated with, for example, lead-lag and/or flapping motions of a proprotor blade. As used herein, the term lateral force includes forces that are generally normal to the radial direction of the yoke and/or normal to pitch change axis 220. Such lateral forces may tend to urge centrifugal force bearing 208 out of concentricity with inboard beam 212. In the illustrated embodiment, centrifugal force bearing 208 includes a lateral movement constraint feature depicted as boss 208e that extends radially inwardly. Boss 208e is operably associated with and received within a lateral movement constraint feature depicted as cavity 212d of inboard beam 212 that extends radially inwardly. As illustrated, boss 208e and cavity 212d are each non-cylindrical features depicted as multisided geometric prism features in the form of four-sided geometric prism features. Preferably, boss 208e and cavity 212d have a close fitting relationship that prevents and/or substantially prevents relative lateral movement between centrifugal force bearing 208 and inboard beam 212 during rotary operations.

In addition to the centrifugal forces and lateral forces, the components of bearing assembly 206 also experience torsional forces associated with, for example, pitch change operations of a proprotor blade. Such torsional forces may tend to urge centrifugal force bearing 208 to rotate relative to inboard beam 212. In the illustrated embodiment, centrifugal force bearing 208 includes an anti-rotation feature depicted as boss 208e that extends radially inwardly. Boss 208e corresponds with and is received within an anti-rotation feature depicted as cavity 212d of inboard beam 212 that extends radially inwardly. As illustrated, boss 208e and cavity 212d are each non-cylindrical features depicted as multisided geometric prism features in the form of four-sided geometric prism features. Preferably, boss 208e and cavity 212d have a close fitting relationship that prevents and/or substantially prevents relative rotation between centrifugal force bearing 208 and inboard beam 212 during rotary operations. In the illustrated embodiment, the lateral movement constraint feature and the anti-rotation feature of centrifugal force bearing 208 are integral to one another.

Referring to FIGS. 5A-5D, a bearing assembly for a proprotor system is generally designated 306. As stated herein, the coupling between centrifugal force bearing 308 and inboard beam 312 preferably serves three important functions including providing a centrifugal force load path function, a lateral movement constraint function and an anti-rotation function. During rotary operations of an aircraft using a proprotor system of the present disclosure, the centrifugal force load generated by each proprotor blade is transferred to the yoke by a bearing assembly 306. Within each bearing assembly 306, the centrifugal force load path includes mating surfaces 308f, 308g of centrifugal force bearing 308 and mating surfaces 312g, 312h of inboard beam 312. In the illustrated embodiment, mating surfaces 308f, 308g are generally planar mating surfaces with a radial step therebetween. Likewise, mating surfaces 312g, 312h are generally planar mating surfaces with a radial step therebetween. As illustrated, mating surface 308f of centrifugal force bearing 308 has a contact relationship with corresponding mating surface 312g of inboard beam 312. Similarly, mating surface 308g of centrifugal force bearing 308 has a contact relationship with corresponding mating surface 312h of inboard beam 312. Thus, during rotary operations of an aircraft using a proprotor system of the present disclosure, the centrifugal force load path includes mating surfaces 308f, 308g of centrifugal force bearing 308 and mating surfaces 312g, 312h of inboard beam 312.

In addition to the centrifugal forces that are generally in the radially outward direction relative to yoke 202, the components of bearing assembly 306 also experience lateral forces associated with, for example, lead-lag and/or flapping motions of a proprotor blade. Such lateral forces may tend to urge centrifugal force bearing 308 out of concentricity with inboard beam 312. In the illustrated embodiment, centrifugal force bearing 308 includes a lateral movement constraint feature depicted as boss 308e that extends radially inwardly. Boss 308e is operably associated with and received within a lateral movement constraint feature depicted as cavity 312d of inboard beam 312 that extends radially inwardly. As illustrated, boss 308e and cavity 312d are each cylindrical features. Preferably, boss 308e and cavity 312d have a close fitting relationship that prevents and/or substantially prevents relative lateral movement between centrifugal force bearing 308 and inboard beam 312 during rotary operations.

Figure 5A:
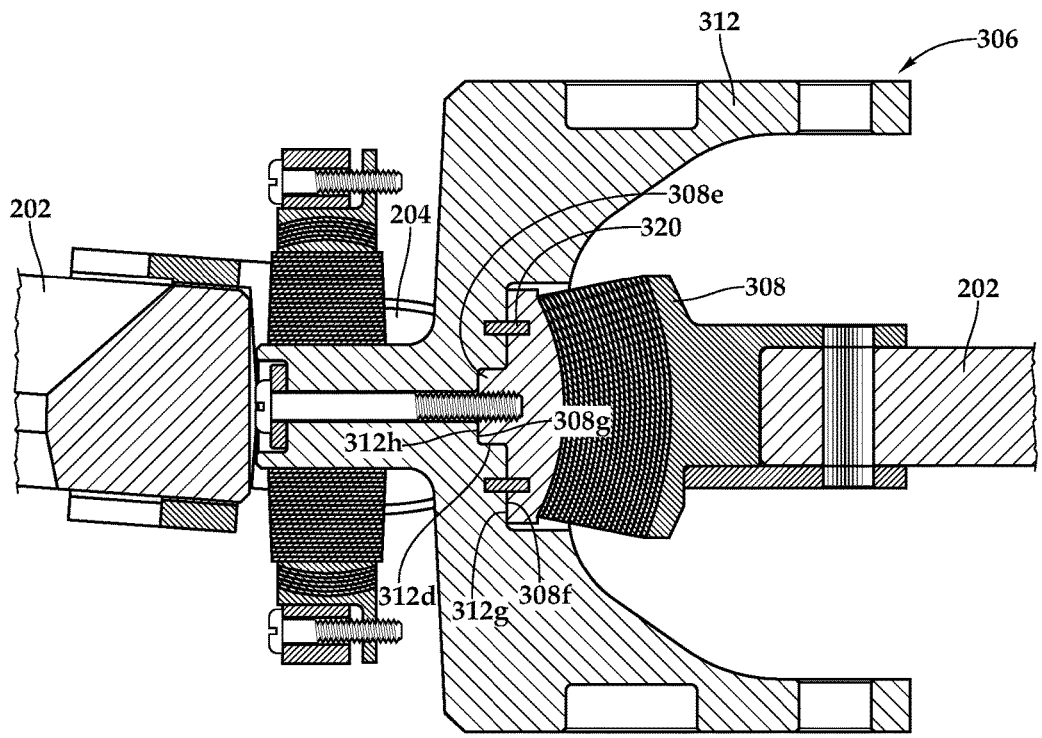
FIGS. 5A-5D are various views of a bearing assembly and component parts thereof for a proprotor system in accordance with embodiments of the present disclosure.
Figure 5B:
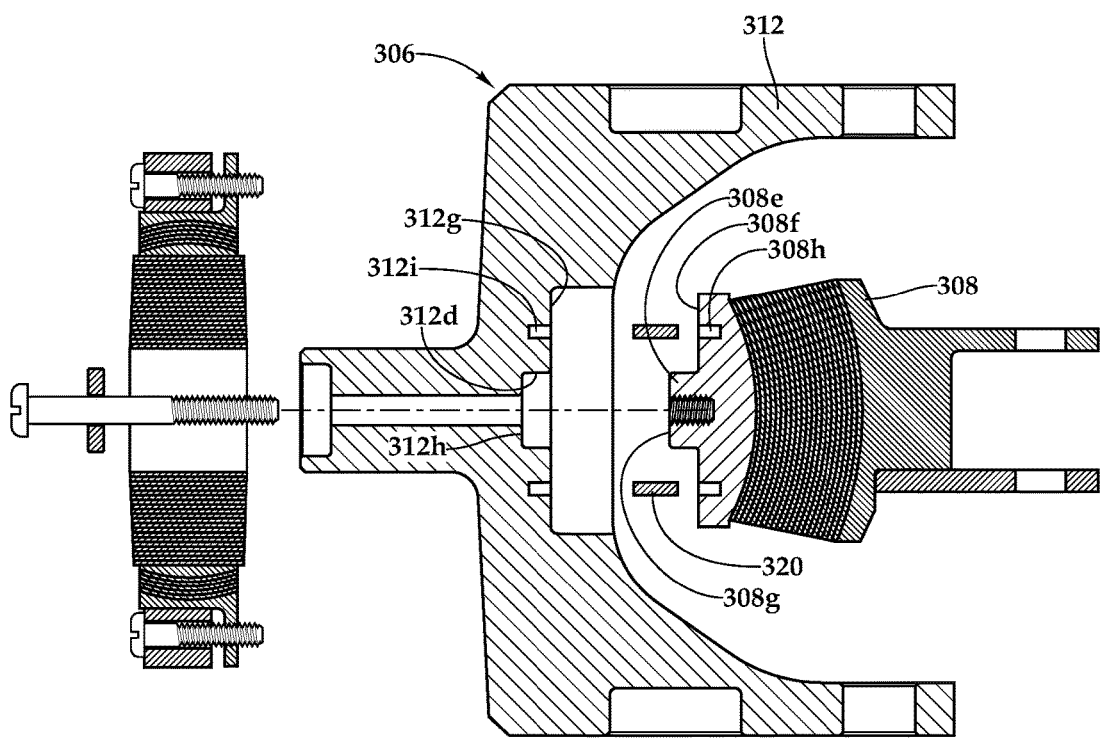
Figure 5C:
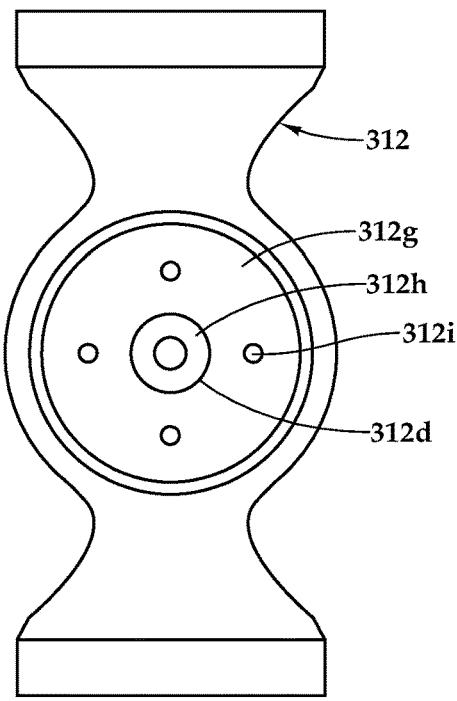
Figure 5D:
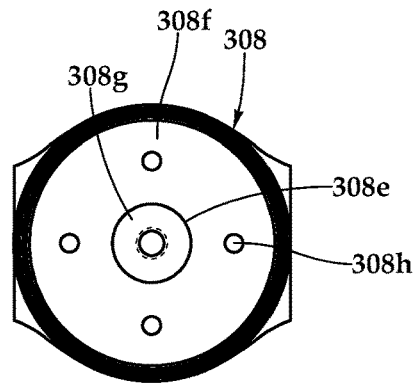

In addition to the centrifugal forces and lateral forces, the components of bearing assembly 306 also experience torsional forces associated with, for example, pitch change operations of a proprotor blade. Such torsional forces may tend to urge centrifugal force bearing 308 to rotate relative to inboard beam 312. In the illustrated embodiment, centrifugal force bearing 308 includes an anti-rotation feature depicted as a plurality of sockets 308h that extend radially outwardly. Sockets 308h correspond with an anti-rotation feature depicted as sockets 312i of inboard beam 312 that extend radially inwardly. As best seen in FIG. 5A, a plurality of pins 320 extend into corresponding sockets 308h of centrifugal force bearing 308 and sockets 312*i* of inboard beam 312 to prevent and/or substantially prevent relative rotation between centrifugal force bearing 308 and inboard beam 312 during rotary operations. In the illustrated embodiment, the lateral movement constraint feature and the anti-rotation feature of centrifugal force bearing 308 are independent of one another. Even though centrifugal force bearing 308 and inboard beam 312 are depicted as having a particular number of anti-rotation sockets 308*h*, 312*i*, in a particular arrangement, it should be understood by those having ordinary skill in the art that the centrifugal force bearings and inboard beams of the present disclosure could have any number of anti-rotation sockets both greater than or less than four that are arranged in any desired orientation including having uniform or nonuniform circumferential orientations, uniform or non-uniform socket depths, uniform or non-uniform socket diameters and/or uniform or non-uniform distances from the pitch change axis.

Figure 6C:
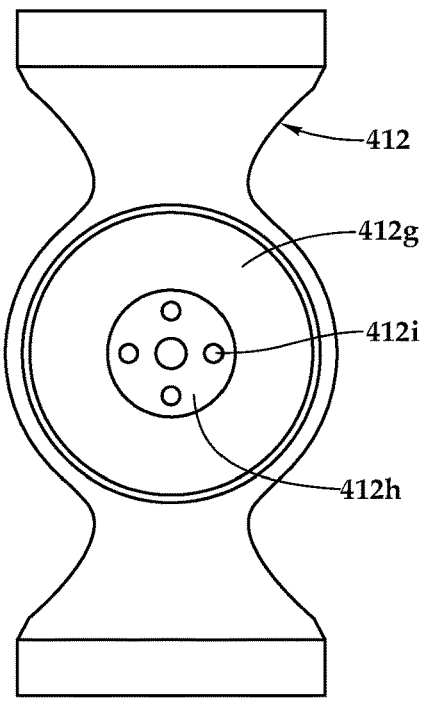
FIGS. 6A-6D are various views of a bearing assembly and component parts thereof for a proprotor system in accordance with embodiments of the present disclosure.
Figure 6D:
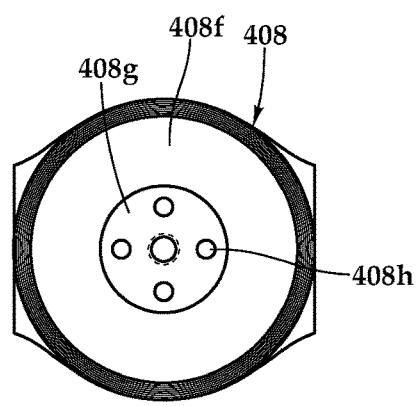
Figure 6A:
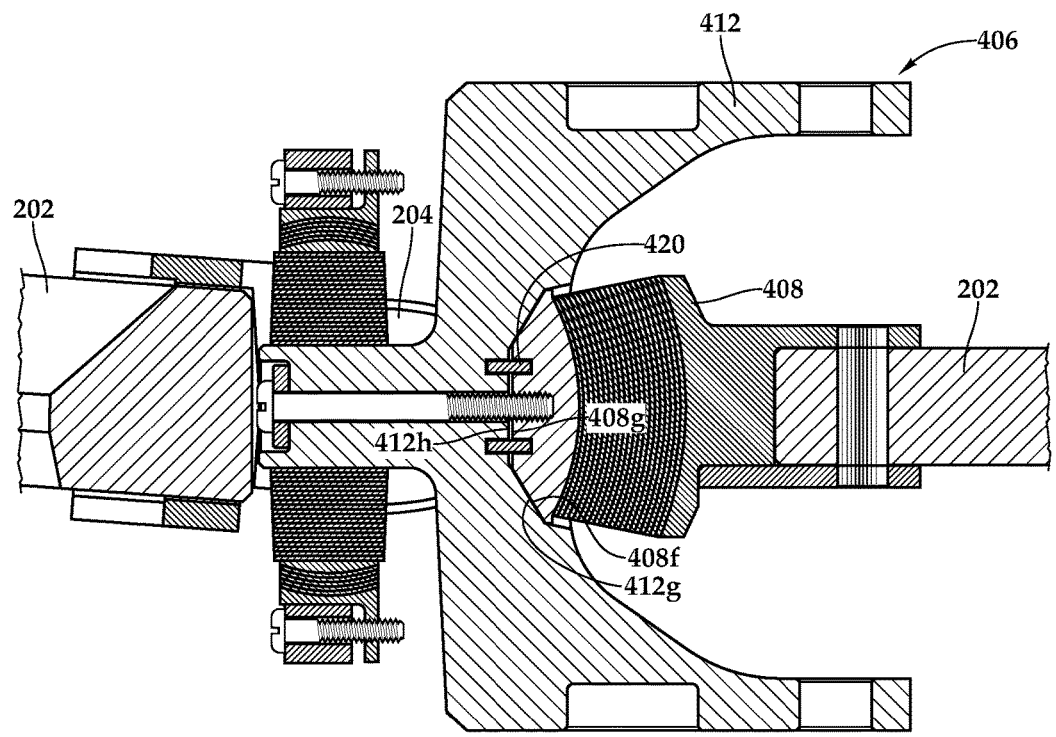
Figure 6B:
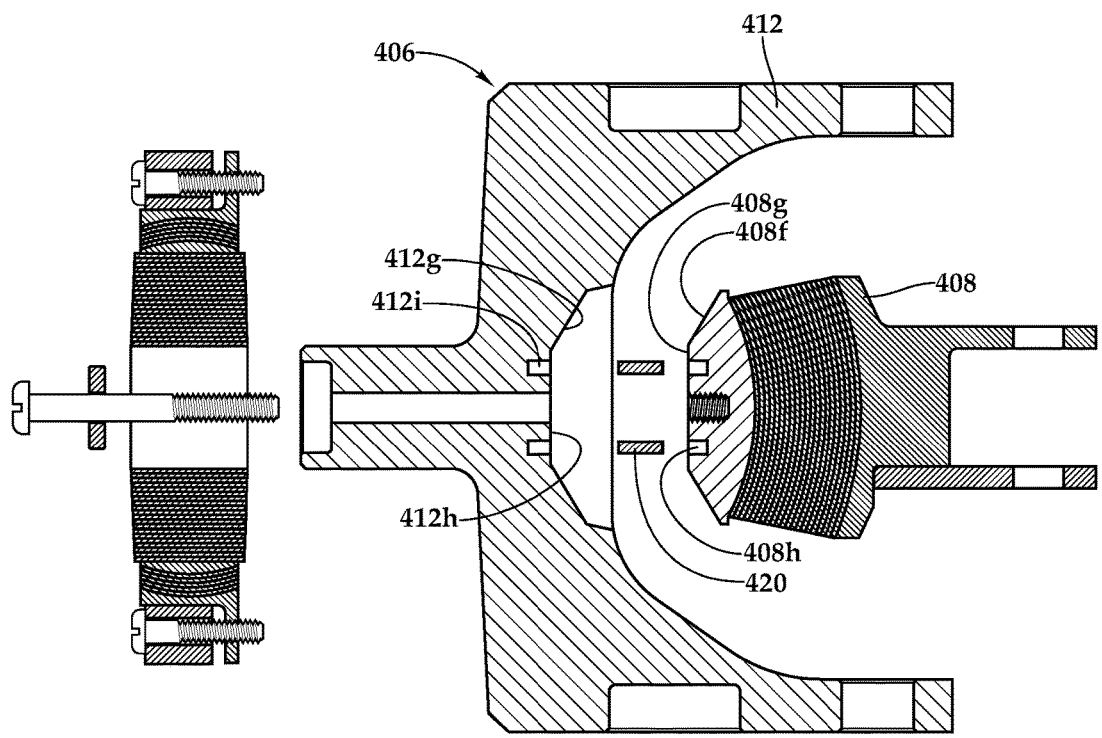

Referring to FIGS. 6A-6D, a bearing assembly for a proprotor system is generally designated 406. As stated herein, the coupling between a centrifugal force bearing 408 and an inboard beam 412 preferably serves three important functions including providing a centrifugal force load path function, a lateral movement constraint function and an anti-rotation function. During rotary operations of an aircraft using a proprotor system of the present disclosure, the centrifugal force load generated by each proprotor blade is transferred to the yoke by a bearing assembly 406. Within each bearing assembly 406, the centrifugal force load path includes mating surfaces 408*f*, 408*g* of centrifugal force bearing 408 and mating surfaces 412*g*, 412*h* of inboard beam 412. In the illustrated embodiment, mating surface 408*f* is a generally conical mating surface and mating surface 408*g* is a generally planar mating surface. Likewise, mating surface 412*g* is a generally conical mating surface and mating surface 412*h* is a generally planar mating surface. As illustrated, mating surface 408*f* of centrifugal force bearing 408 has a contact relationship with corresponding mating surface 412*g* of inboard beam 412. As best seen in FIG. 6A, mating surface 408*g* of centrifugal force bearing 408 has a spaced apart relationship with corresponding mating surface 412*h* of inboard beam 412. Thus, during rotary operations of an aircraft using a proprotor system of the present disclosure, the centrifugal force load path includes mating surface 408*f* of centrifugal force bearing 408 and mating surface 412*g* of inboard beam 412.

In addition to the centrifugal forces that are generally in the radially outward direction relative to yoke 202, the components of bearing assembly 406 also experience lateral forces associated with, for example, lead-lag and/or flapping motions of a proprotor blade. Such lateral forces may tend to urge centrifugal force bearing 408 out of concentricity with inboard beam 412. In the illustrated embodiment, centrifugal force bearing 408 includes a lateral movement constraint feature depicted as mating surface 408*f* that extends radially inwardly. Mating surface 408*f* is operably associated with and received within a lateral movement constraint feature depicted as mating surface 412*g* of inboard beam 412 that extends radially inwardly. As illustrated, mating surface 408*f* and mating surface 412*g* are each conical features that provide a self-aligning interface between centrifugal force bearing 408 and inboard beam 412 that prevents and/or substantially prevents relative lateral movement between centrifugal force bearing 408 and inboard beam 412 during rotary operations.

In addition to the centrifugal forces and lateral forces, the components of bearing assembly 406 also experience torsional forces associated with, for example, pitch change operations of a proprotor blade. Such torsional forces may tend to urge centrifugal force bearing 408 to rotate relative to inboard beam 412. In the illustrated embodiment, centrifugal force bearing 408 includes an anti-rotation feature depicted as a plurality of sockets 408*h* that extend radially outwardly. Sockets 408*h* correspond with an anti-rotation feature depicted as sockets 412*i* of inboard beam 412 that extend radially inwardly. As best seen in FIG. 6A, a plurality of pins 420 extend into corresponding sockets 408*h* of centrifugal force bearing 408 and sockets 412*i* of inboard beam 412 to prevent and/or substantially prevent relative rotation between centrifugal force bearing 408 and inboard beam 412 during rotary operations. In the illustrated embodiment, the lateral movement constraint feature and the anti-rotation feature of centrifugal force bearing 408 are independent of one another.

Figure 7A:
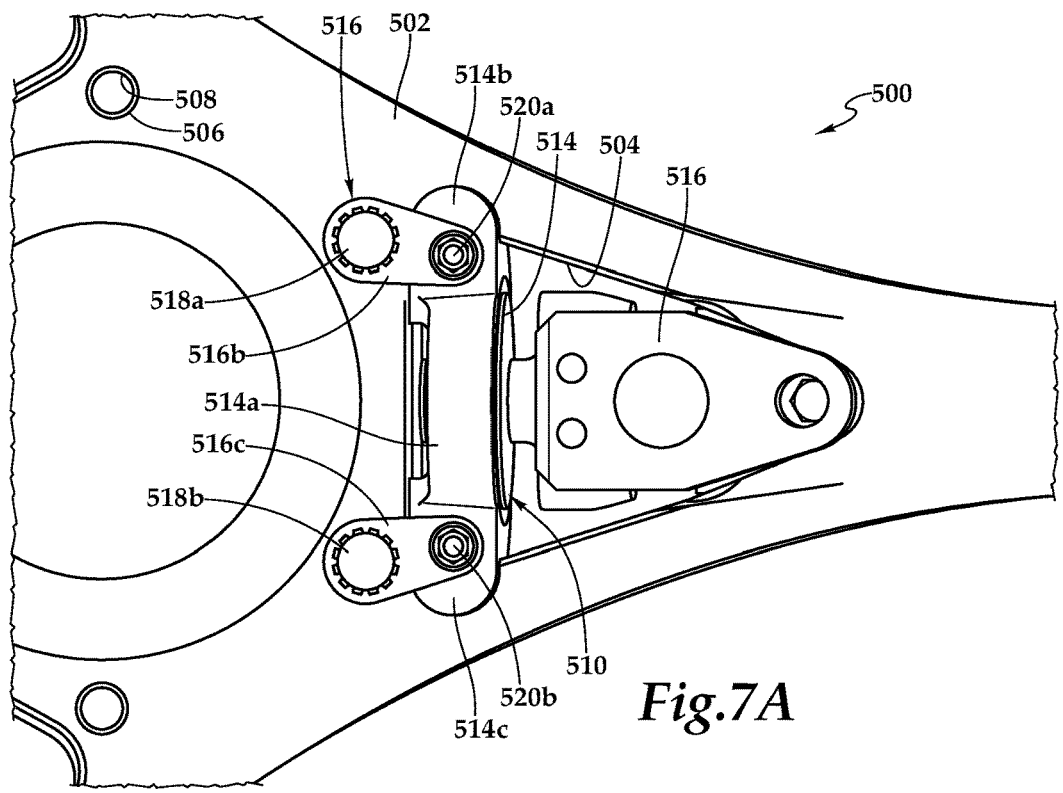
FIGS. 7A-7D are various views of a bearing assembly disposed in an inboard pocket of a yoke for a proprotor system in accordance with embodiments of the present disclosure.
Figure 7B:
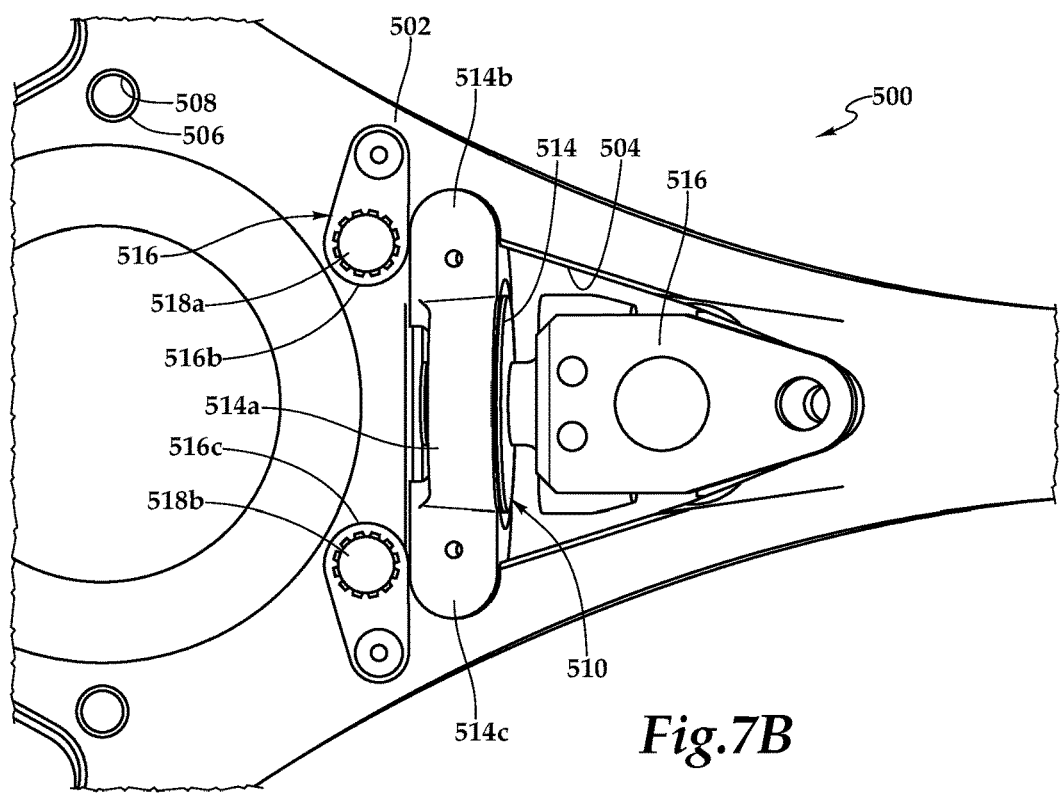
Figure 7C:
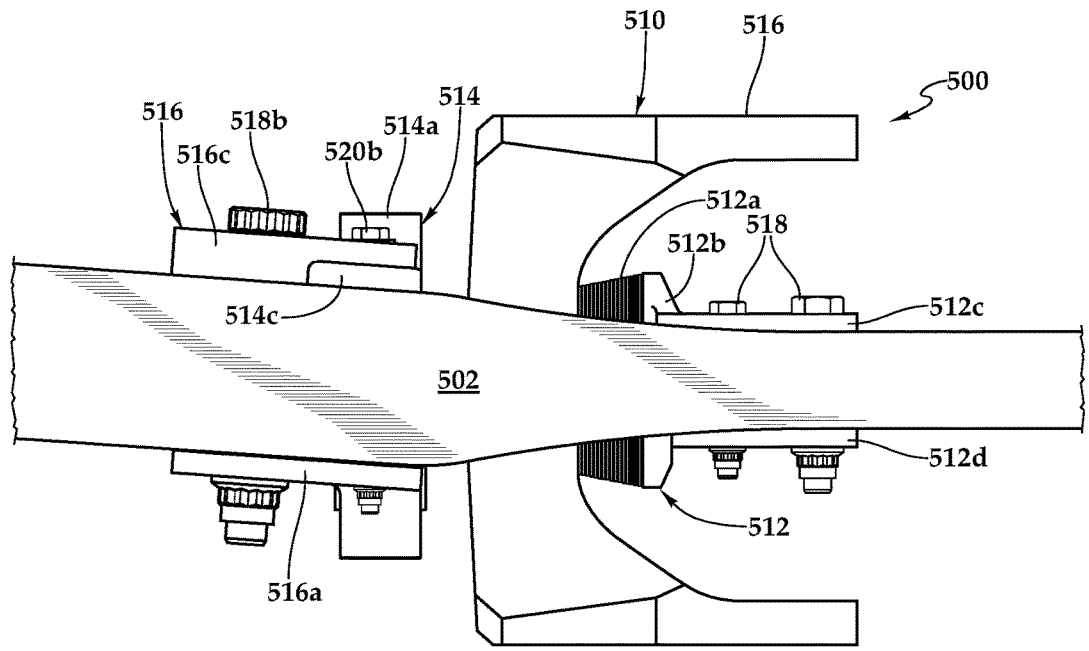

Referring next to FIGS. 7A-7D in the drawings, therein are depicted various views of a proprotor system 500 of the present disclosure. Proprotor system 500 includes a yoke 502 depicted as having three blade arms each including an inboard pocket 504 and a pair of hub bolt openings 506 each having a bushing 508 secured therein. A bearing assembly 510 is disposed in each of the inboard pockets 504 of yoke 502, for clarity of illustration, only one such bearing assembly 510 is shown in FIGS. 7A-7D. Bearing assembly 510 includes a centrifugal force bearing 512, a shear bearing 514 and an inboard beam 516. As best seen in FIG. 7C, centrifugal force bearing 512 has is a bearing element 512*a*, an integral shoe 512*b* that includes an upper clamp plate 512*c* and an independent lower clamp plate 512*d*. Preferably, the connection between bearing element 512*a* and integral shoe 512*b* is permanent and may be made by vulcanizing the elastomeric material of bearing element 512*a* to the adjacent surface of integral shoe 512*b* or by bonded, adhered or otherwise secured the elastomeric material in a non-removable manner to integral shoe 512*b*. Lower clamp plate 512*d* is independent of integral shoe 512*b* to enable installation and removal of bearing assembly 510 relative to inboard pocket 504 of yoke 502. In the installed orientation, lower clamp plate 512*d* is coupled to upper clamp plate 512*c* by one or more bolts 518 which also couple centrifugal force bearing 512 to yoke 502 outboard of inboard pocket 504.

In the illustrated embodiment, shear bearing 514 includes a metal bearing ring 514*a* that is preferably permanently coupled to an elastomer element of shear bearing 514 by vulcanizing, bonding, adhering or otherwise securing the elastomeric material to the inner surface of bearing ring 514*a*. In the illustrated embodiment, bearing ring 514*a* includes a pair of oppositely disposed flanges 514*b*, 514*c* forming an upper clamp plate. Shear bearing 514 is selectively coupled to yoke 502 using a latch assembly 516. In the illustrated embodiment, latch assembly 516 includes a lower clamp plate 516*a* and a pair of cam latches 516*b*, 516*c*. Lower clamp plate 516*a* is coupled to cam latches 516*b*, 516*c* respectively by hub bolts 518*a*, 518*b*. As described above, hub bolts 518*a*, 518*b* have been foreshortened for convenience of illustration as hub bolts 518*a*, 518*b* would also coupled the constant velocity joint to yoke 502. It is noted that one or more of the components of bearing assembly 510 may need inspection, maintenance and/or replacement on a periodic basis. The procedure for such operations may be complicated by the need to remove the hub bolts and the other associated hub components, such as the constant velocity joint, from the yoke 502 to simply inspection or replace a single bearing assembly 510. In the present embodiment, however, bearing assemblies 510 have improved access for installation, removal and inspections due to the operation of latch assemblies 516.

Figure 7D:
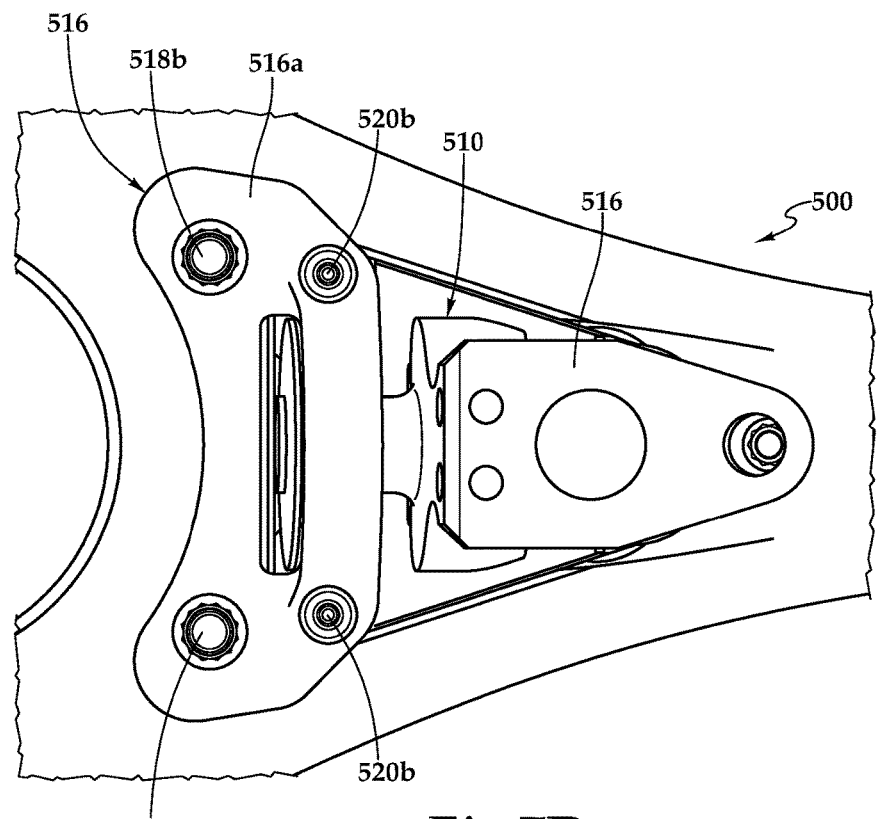

In the illustrated embodiment, latch assembly 516 has an engaged position depicted in FIGS. 7A, 7C, 7D and a disengaged position depicted in FIG. 7B. More specifically, cam latch 516b is rotatable relative to yoke 502 about hub bolt 518a between the engaged and disengaged positions, as seen in the comparison between FIGS. 7A and 7B. Likewise, cam latch 516c is rotatable relative to yoke 502 about hub bolt 518b between the engaged and disengaged positions, also seen in the comparison between FIGS. 7A and 7B. In the engaged position, bearing bolts 520a, 520b may pass through aligned bearing bolt openings of respective cam latches 516b, 516c, respective flanges 514b, 514c and lower clamp plate 516a to couple bearing assembly 510 to yoke 502 with flanges 514b, 514c having a contact relationship with an upper surface of yoke 504 and lower clamp plate 516a having a contact relationship with a lower surface of yoke 504.

To gain access to bearing assembly 510, bearing bolts 520a, 520b may be removed from bearing assembly 510 such that cam latches 516b, 516c may be rotated relative to yoke 502 about hub bolts 518a, 518b from the engaged position of FIG. 7A to the disengaged position of FIG. 7B enabling inspection, installation and removal of bearing assembly 510 relative to inboard pocket 504 without removal of hub bolts 518a, 518b, thereby alleviating the complications associated therewith. Thus, in both the engaged and disengaged positions of latch assembly 516, hub bolts 518a, 518b remain in place passing through aligned hub bolt openings of cam latches 516b, 516c, yoke 502 and clamp plate 516a. In certain implementations, it may be desirable to loosen hub bolts 518a, 518b when operating of cam latches 516b, 516c between the engaged and disengaged positions.

Figure 8A:
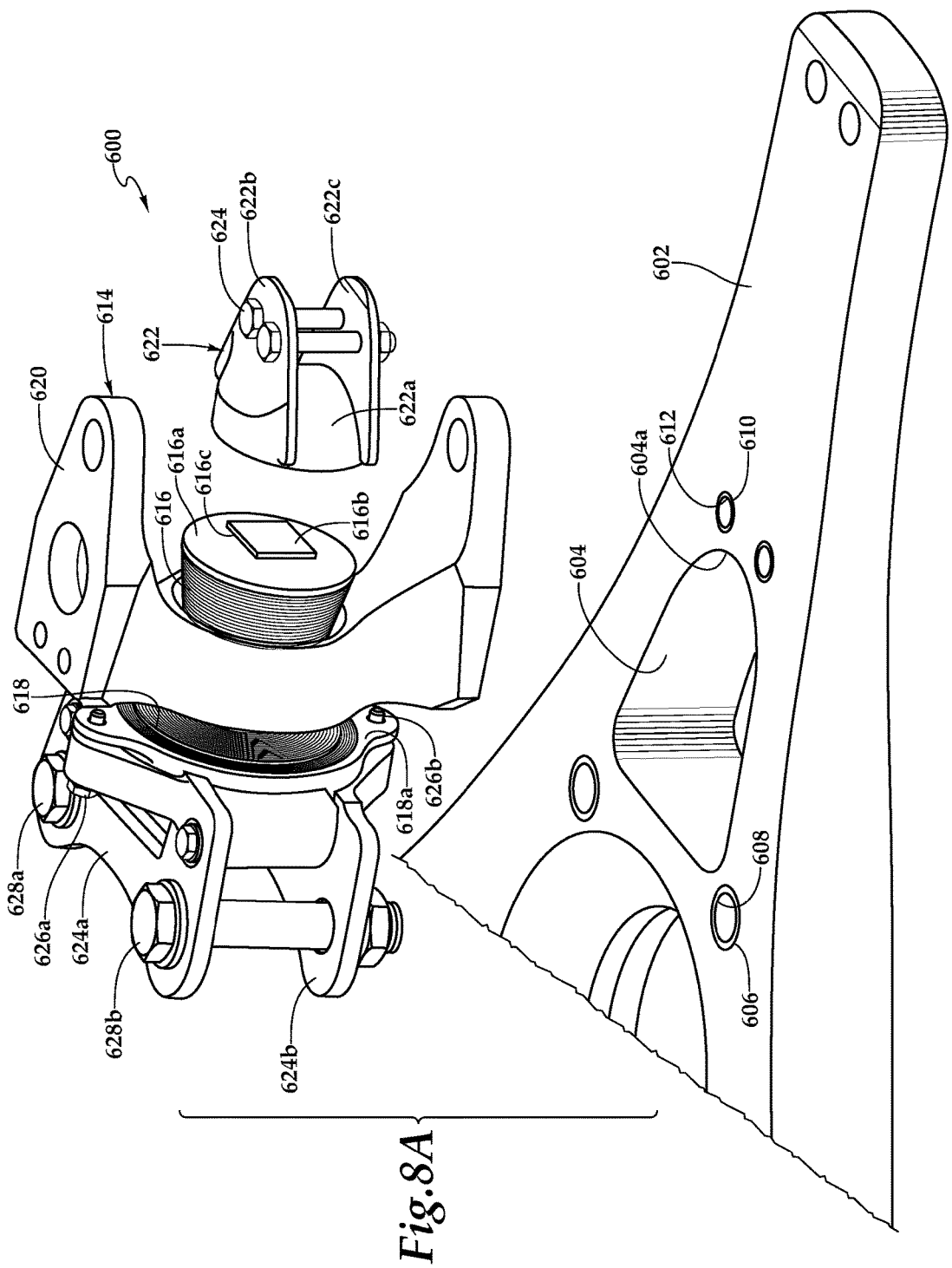
FIGS. 8A-8C are various views of a bearing assembly disposed in an inboard pocket of a yoke for a proprotor system in accordance with embodiments of the present disclosure.
Figure 8B:
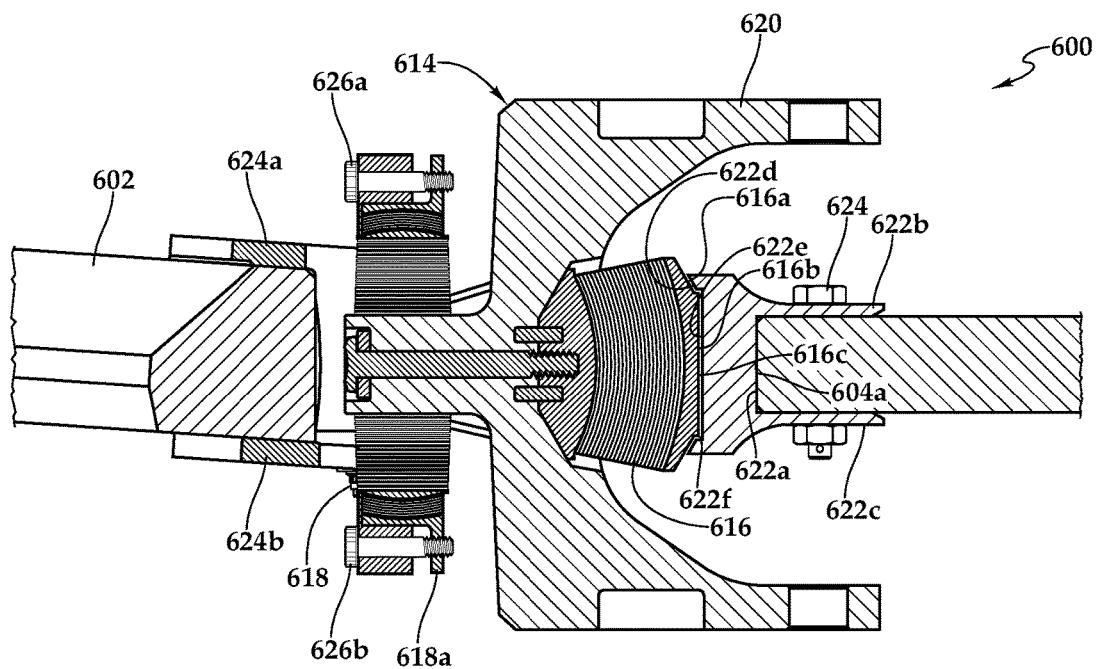
Figure 8C:
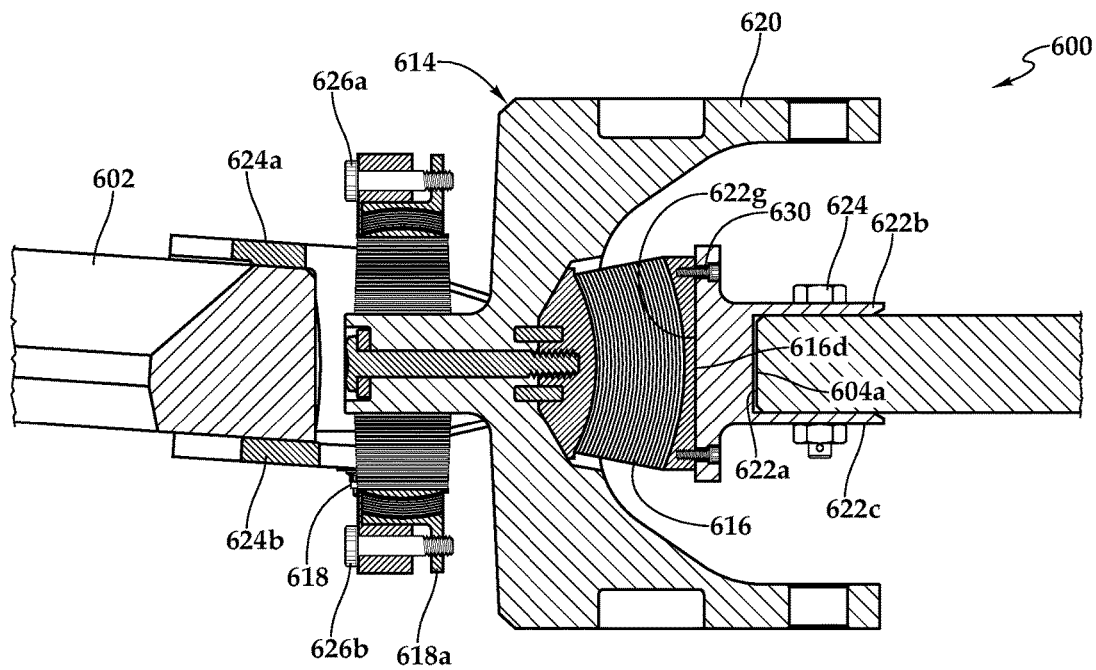
Figure 9A:
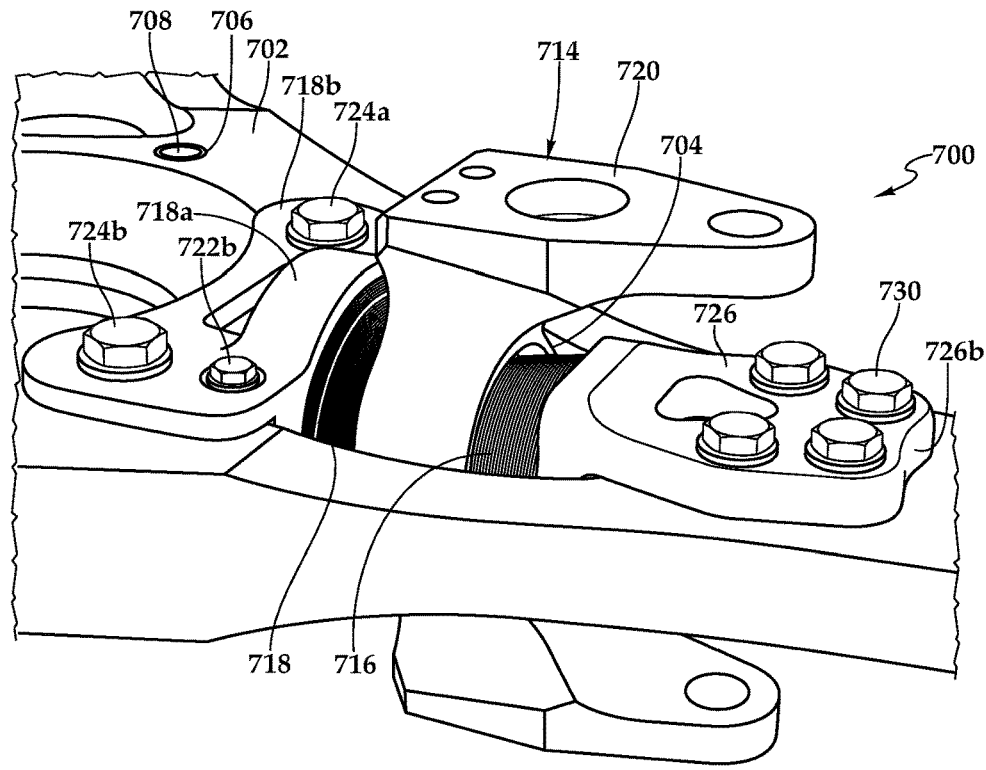
FIGS. 9A-9D are various views of a bearing assembly disposed in an inboard pocket of a yoke for a proprotor system in accordance with embodiments of the present disclosure.
Figure 9B:
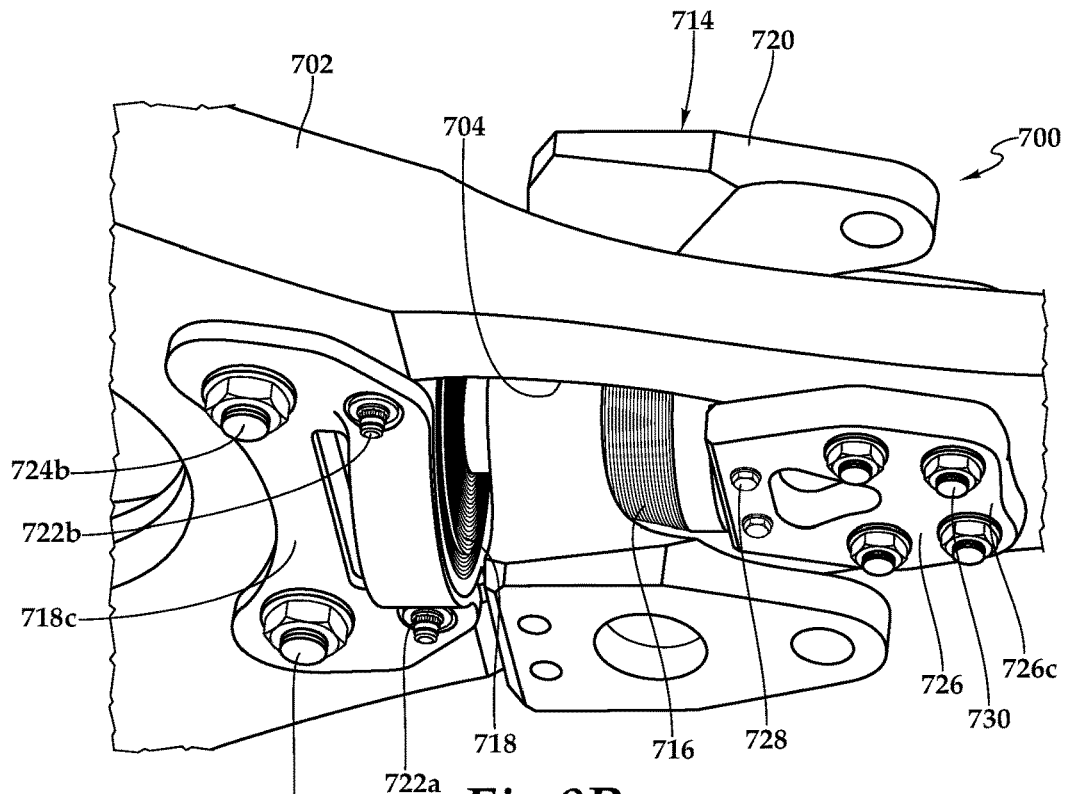
Figure 9C:
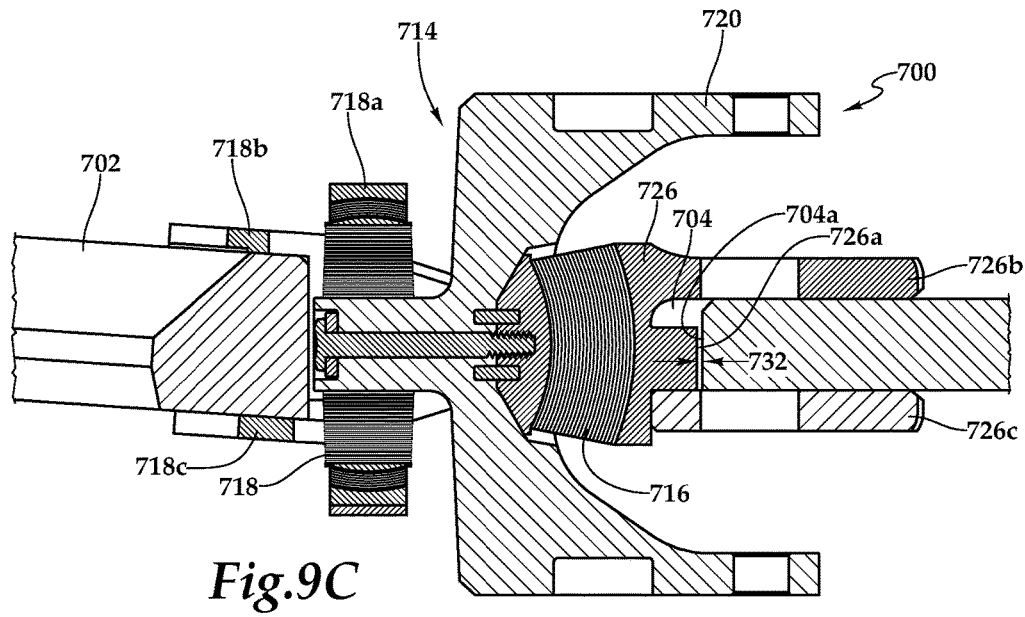
Figure 9D:
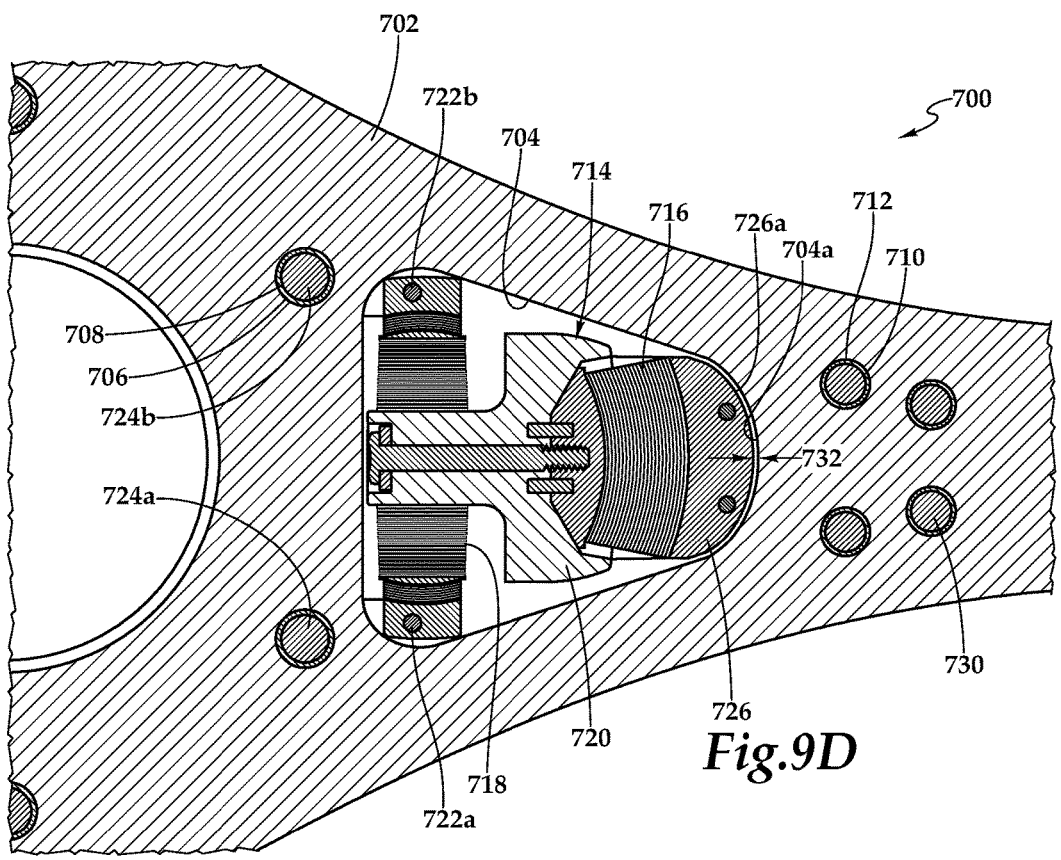

Referring next to FIGS. 8A-8C in the drawings, therein are depicted various views of a proprotor system 600 of the present disclosure. Proprotor system 600 includes a yoke 602 depicted as having three blade arms each including an inboard pocket 604 having a load transfer surface 604a. Load transfer surface 604a has an arcuate profile such as a circular arc profile or an elliptical arc profile. In addition, each blade arm includes a pair of hub bolt openings 606 each having a bushing 608 secured therein and a pair of shoe bolt openings 610 each having a bushing 612 secured therein. A bearing assembly 614 is disposed in each of the inboard pockets 604 of yoke 602, for clarity of illustration, only one such bearing assembly 614 is shown in FIGS. 8A-8C. Bearing assembly 614 includes a centrifugal force bearing 616, a shear bearing 618, an inboard beam 620 and an independent shoe 622. In the illustrated embodiment, shear bearing 618 includes a metal bearing ring 618a that is preferably permanently coupled to an elastomer element of shear bearing 618 by vulcanizing, bonding, adhering or otherwise securing the elastomeric material to the inner surface of bearing ring 618a. In the illustrated embodiment, bearing ring 618a is coupled to an upper clamp plate 624a and a lower clamp plate 624b using screws 626a, 626b. Upper and lower clamp plates 624a, 624b are coupled to yoke 602 by hub bolts 628a, 628b. As described above, hub bolts 628a, 628b have been foreshortened for convenience of illustration as hub bolts 628a, 628b would also coupled the constant velocity joint to yoke 602.

As best seen in FIG. 8A, independent shoe 622 includes a load transfer surface 622a, an upper clamp plate 622b and a lower clamp plate 622c. Load transfer surface 622a has an arcuate profile such as a circular arc profile or an elliptical arc profile. The arcuate profile of load transfer surface 622a of independent shoe 622 matches the arcuate profile of load transfer surface 604a of inboard pocket 604 to form a centrifugal force load path therebetween. Load transfer surface 622a of independent shoe 622 may be bonded, adhered or otherwise secured to load transfer surface 604a of inboard pocket 604. Alternatively or additionally, one or more shoe bolts 624 may pass through aligned shoe bolt openings of upper clamp plate 622b, yoke 602 and lower clamp plate 622c to form a clamped relationship between independent shoe 622 and yoke 602 outboard of inboard pocket 604. The bonded relationship and/or the clamped relationship between independent shoe 622 and yoke 602 prevents relative movement therebetween to maintain the contact relationship and centrifugal force load path therebetween.

The coupling between independent shoe 622 and centrifugal force bearing 616 preferably serves three important functions including providing a centrifugal force load path function, a lateral movement constraint function and an anti-rotation function. During rotary operations of an aircraft using proprotor system 600, the centrifugal force load generated by each proprotor blade is transferred to yoke 620 by bearing assembly 614. Within each bearing assembly 614, the centrifugal force load path includes mating surfaces 616a, 616b of centrifugal force bearing 616 and mating surfaces 622d, 622e of independent shoe 622. In the illustrated embodiment, mating surface 616a is a generally conical mating surface and mating surface 616b is a generally planar mating surface. Likewise, mating surface 622d is a generally conical mating surface and mating surface 622e is a generally planar mating surface. As illustrated, mating surface 616a of centrifugal force bearing 616 has a contact relationship with corresponding mating surface 622d of independent shoe 622. As best seen in FIG. 8B, mating surface 616b of centrifugal force bearing 616 has a spaced apart relationship with corresponding mating surface 622e of independent shoe 622. Thus, during rotary operations of an aircraft using proprotor system 600, the centrifugal force load path includes mating surface 616a of centrifugal force bearing 616 and mating surface 622d of independent shoe 622.

In addition to the centrifugal forces that are generally in the radially outward direction relative to yoke 602, the components of bearing assembly 614 also experience lateral forces associated with, for example, lead-lag and/or flapping motions of a proprotor blade. Such lateral forces may tend to urge centrifugal force bearing 616 out of concentricity with independent shoe 622. In the illustrated embodiment, centrifugal force bearing 616 includes a lateral movement constraint feature depicted as boss 616c that extends radially outwardly. Boss 616c is operably associated with and received within a lateral movement constraint feature depicted as cavity 622f of independent shoe 622 that extends radially outwardly. As illustrated, boss 616c and cavity 622f are each non-cylindrical features depicted as multisided geometric prism features in the form of four-sided geometric prism features. Preferably, boss 616c and cavity 622f have a close fitting relationship that prevents and/or substantially prevents relative lateral movement between centrifugal force bearing 616 and independent shoe 622 during rotary operations.

In addition to the centrifugal forces and lateral forces, the components of bearing assembly 614 also experience torsional forces associated with, for example, pitch change operations of a proprotor blade. Such torsional forces may tend to urge centrifugal force bearing 616 to rotate relative to independent shoe 622. In the illustrated embodiment, centrifugal force bearing 616 includes an anti-rotation feature depicted as boss 616c that extends radially outwardly. Boss 616c corresponds with and is received within an anti-rotation feature depicted as cavity 622f of independent shoe 622 that extends radially outwardly. As illustrated, boss 616c and cavity 622f are each non-cylindrical features depicted as multisided geometric prism features in the form of four-sided geometric prism features. Preferably, boss 616c and cavity 622f have a close fitting relationship that prevents and/or substantially prevents relative rotation between centrifugal force bearing 616 and independent shoe 622 during rotary operations.

An alternate configuration of the coupling between independent shoe 622 and centrifugal force bearing 616 is depicted in FIG. 8C. In this configuration, the centrifugal force load path includes generally planar mating surface 616d of centrifugal force bearing 616 and generally planar mating surface 622g of independent shoe 622. A plurality of pins depicted as four screws 630 (only two being visible in the drawing) extend between independent shoe 622 and centrifugal force bearing 616 to prevent and/or substantially prevents relative lateral movement and relative rotation between centrifugal force bearing 616 and independent shoe 622.

Referring next to FIGS. 9A-9D in the drawings, therein are depicted various views of a proprotor system 700 of the present disclosure. Proprotor system 700 includes a yoke 702 depicted as having three blade arms each including an inboard pocket 704 with an outboard surface 704a, a pair of hub bolt openings 706 each having a bushing 708 secured therein and four shoe bolt openings 710 each having a bushing 712 secured therein. A bearing assembly 714 is disposed in each of the inboard pockets 704 of yoke 702, for clarity of illustration, only one such bearing assembly 714 is shown in FIGS. 9A-9D. Bearing assembly 714 includes a centrifugal force bearing 716, a shear bearing 718 and an inboard beam 720. In the illustrated embodiment, shear bearing 718 includes a metal bearing ring 718a that is preferably permanently coupled to an elastomer element of shear bearing 718 by vulcanizing, bonding, adhering or otherwise securing the elastomeric material to the inner surface of bearing ring 718a. Bearing ring 718a includes an upper clamp plate 718b that is coupled to a lower clamp plate 718c by bearing bolts 722a, 722b. Upper and lower clamp plates 718b, 718c are coupled to yoke 702 by hub bolts 724a, 724b. As described above, hub bolts 724a, 724b have been foreshortened for convenience of illustration as hub bolts 724a, 724b would also coupled the constant velocity joint to yoke 702.

Centrifugal force bearing 716 has an integral shoe 726 having an outboard surface 726a and an upper clamp plate 726b. An independent lower clamp plate 726c is coupled to integral shoe 726 by bolts 728 or other suitable connectors. In the illustrated embodiment, a plurality of shoe bolts 730 pass through aligned shoe bolt openings of upper clamp plate 726b, yoke 702 and lower clamp plate 726c to form a clamped relationship between integral shoe 726 and yoke 702 outboard of inboard pocket 704 wherein upper clamp plate 726b may have a contact relationship with an upper surface of yoke 702 and lower clamp plate 726c may have a contact relationship with a lower surface of yoke 702. Importantly, shoe bolt openings 710 are positioned and sized such that outboard surface 726a of integral shoe 726 and outboard surface 704a of inboard pocket 704 have a space apart relationship, as indicated by arrows 732, when upper and lower clamp plate 726b, 726c have the clamped relationship with yoke 702. The space apart relationship prevents centrifugal force load transfer between outboard surface 726a of integral shoe 726 and outboard surface 704a of inboard pocket 704. Instead, shoe bolts 730 provide centrifugal force load paths between bearing assembly 714 and yoke 702. Even though a particular number of shoe bolts 730 have been depicted and described as maintaining the space apart relationship between outboard surface 726a of integral shoe 726 and outboard surface 704a of inboard pocket 704 and as providing the centrifugal force load paths between bearing assembly 714 and yoke 702, it should be understood by those having ordinary skill in the art that the number of shoe bolts could be either less than or greater than four including two shoe bolts, three shoe bolts, five shoe bolts or more.

Figure 10A:
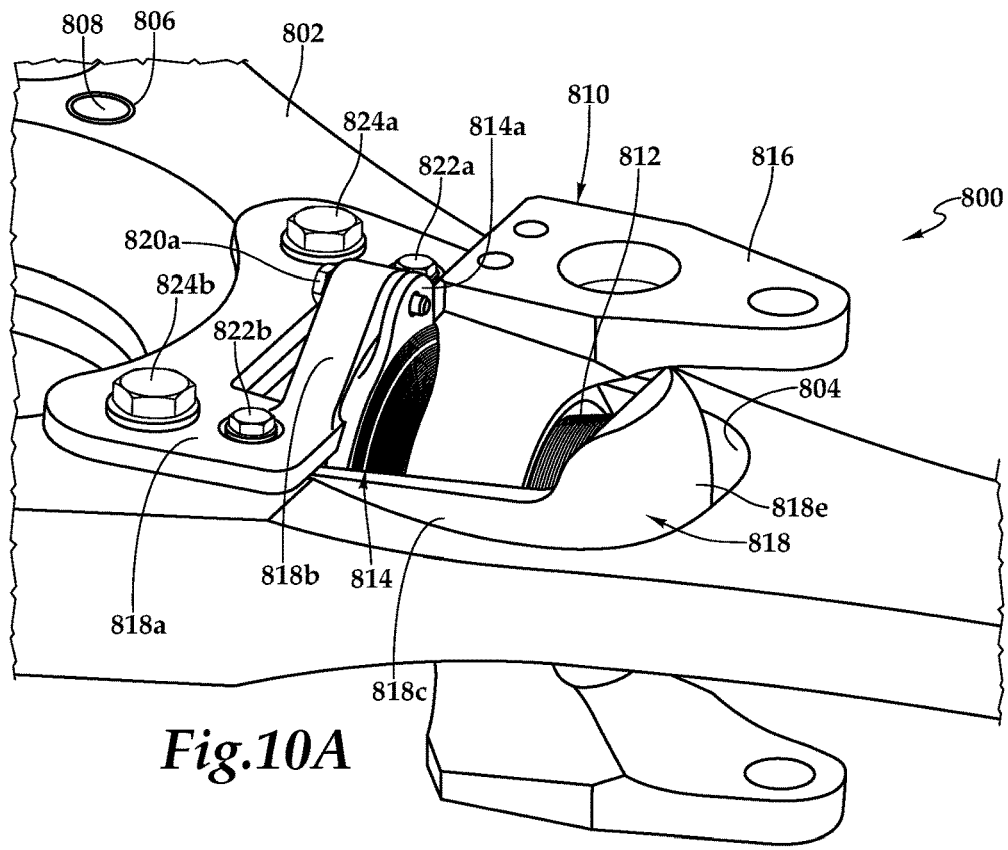
FIGS. 10A-10C are various views of a bearing assembly disposed in an inboard pocket of a yoke for a proprotor system in accordance with embodiments of the present disclosure.
Figure 10B:
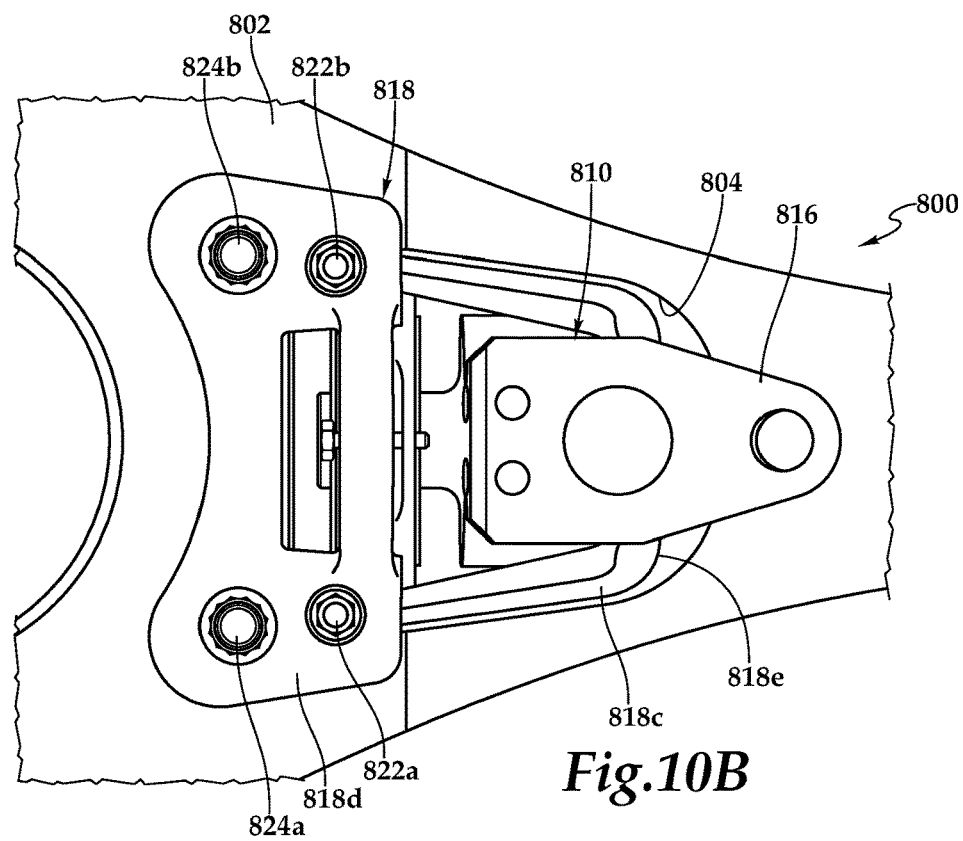
Figure 10C:
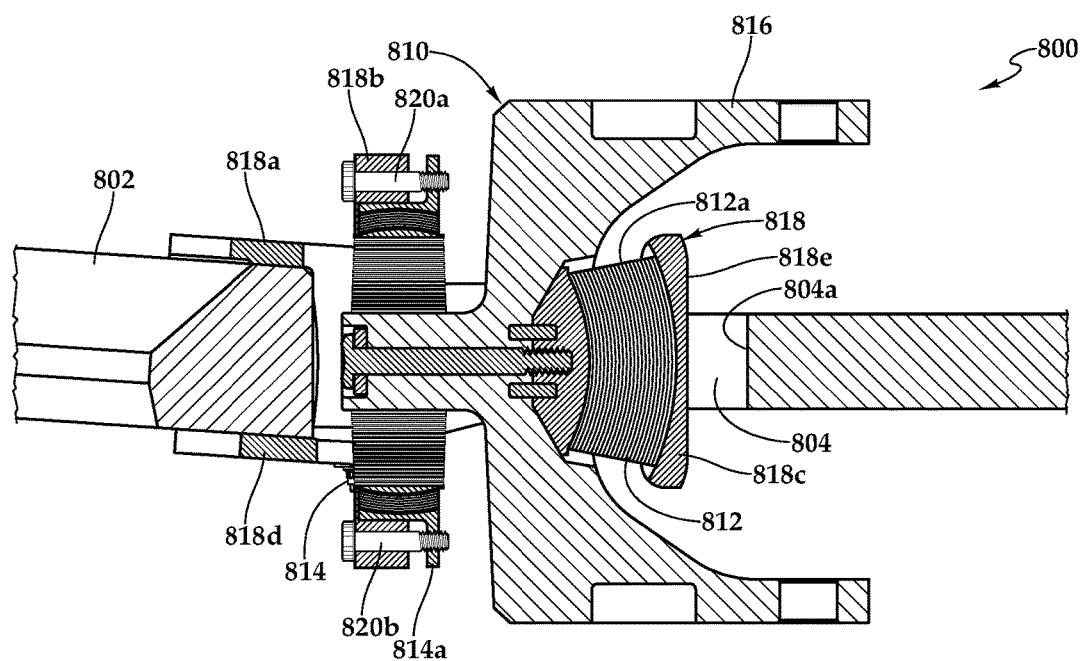
Figure 10D:
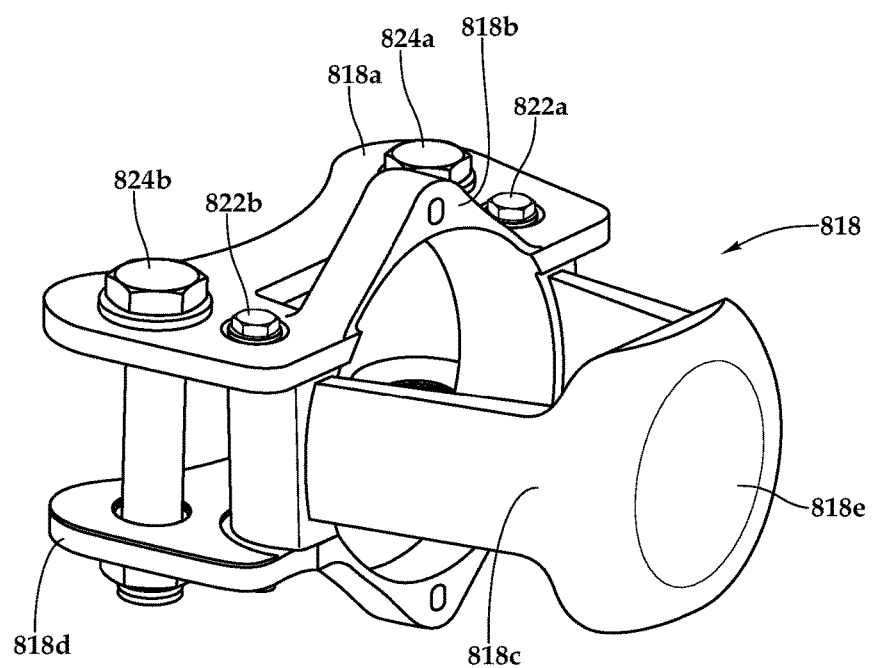
FIG. 10D is an isometric view of a bearing cage of a bearing assembly for a proprotor system in accordance with embodiments of the present disclosure.

Referring next to FIGS. 10A-10D in the drawings, therein are depicted various views of a proprotor system 800 of the present disclosure. Proprotor system 800 includes a yoke 802 depicted as having three blade arms each including an inboard pocket 804 and a pair of hub bolt openings 806 inboard of inboard pocket 804 each having a bushing 808 secured therein. A bearing assembly 810 is disposed in each of the inboard pockets 804 of yoke 802, for clarity of illustration, only one such bearing assembly 810 is shown in FIGS. 10A-10C. Bearing assembly 810 includes a centrifugal force bearing 812, a shear bearing 814, an inboard beam 816 and a bearing cage 818. In the illustrated embodiment, shear bearing 814 includes an integral bearing ring 814a that is preferably permanently coupled to an elastomer element of shear bearing 814 by vulcanizing, bonding, adhering or otherwise securing the elastomeric material to the inner surface of integral bearing ring 814a.

In the illustrated embodiment, bearing cage 818 includes upper clamp plate 818a, bearing ring 818b, bearing retainer 818c and lower clamp plate 818d. Integral bearing ring 814a of shear bearing 814 is coupled to bearing ring 818b of bearing cage 818 by a pair of bolts 820a, 820b. An inboard surface of bearing retainer 818c is preferably permanently coupled to an elastomer bearing element 812a of centrifugal force bearing 812 by vulcanizing, bonding, adhering or otherwise securing the elastomeric material to bearing retainer 818c. In the illustrated embodiment, centrifugal force bearing 812 is disposed within bearing retainer 818c. Upper clamp plate 818a and a lower clamp plate 818d are coupled together by bearing bolts 822a, 822b. Upper and lower clamp plates 818a, 818d are coupled to yoke 802 by hub bolts 824a, 824b. As described above, hub bolts 824a, 824b have been foreshortened for convenience of illustration as hub bolts 824a, 824b would also coupled the constant velocity joint to yoke 802. Importantly, an outboard surface 818e of bearing retainer 818c has a space apart relationship with an outboard surface 804a of inboard pocket 804 when upper and lower clamp plate 818a, 818d have the clamped relationship with yoke 802. The space apart relationship prevents centrifugal force load transfer between outboard surface 818e of bearing retainer 818c and outboard surface 804a of inboard pocket 804. Instead, hub bolts 824a, 824b provide centrifugal force load paths between bearing assembly 810 and yoke 802.

Figure 11A:
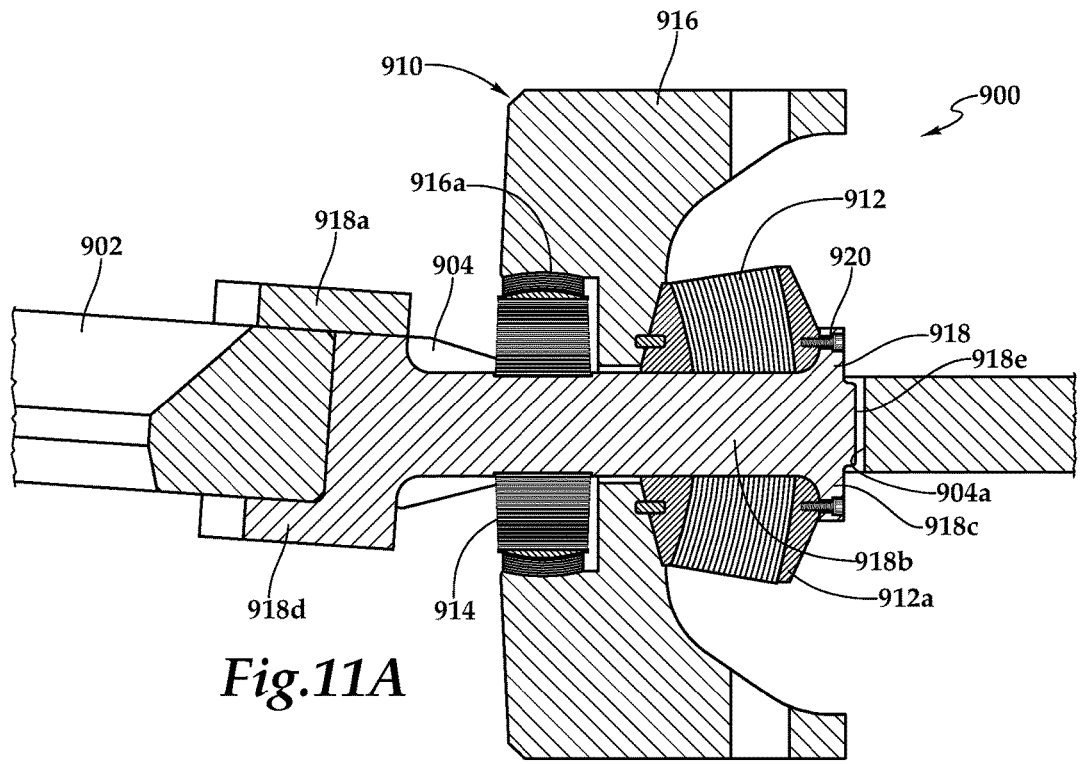
FIG. 11A is a cross sectional view of a bearing assembly disposed in an inboard pocket of a yoke for a proprotor system in accordance with embodiments of the present disclosure.
Figure 11B:
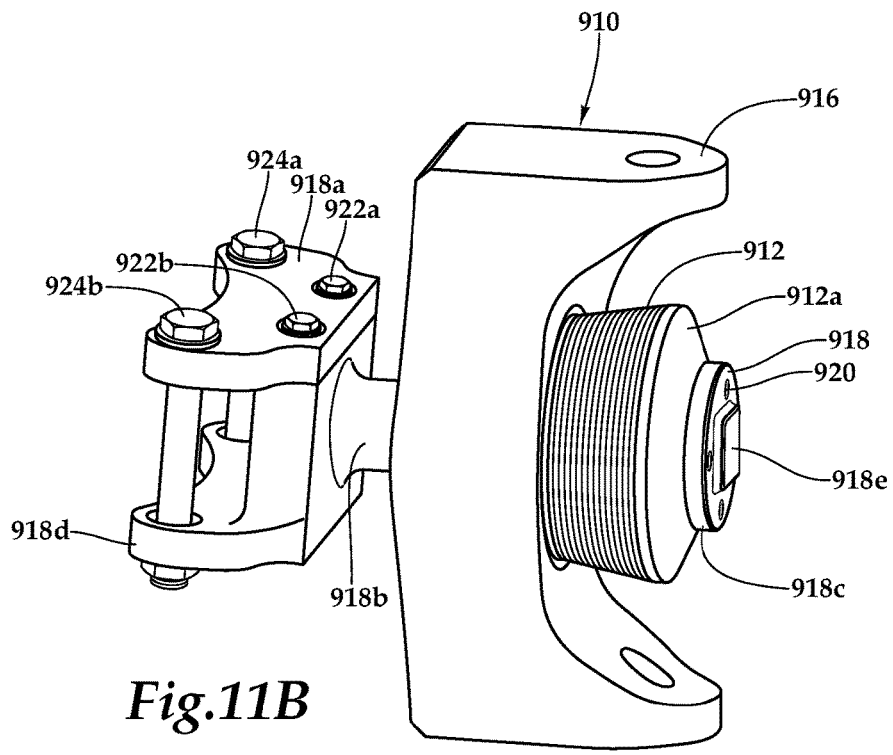
FIG. 11B is an isometric view of a bearing assembly for a proprotor system in accordance with embodiments of the present disclosure.

Referring next to FIGS. 11A-11B in the drawings, therein is depicted various a proprotor system 900 of the present disclosure. Proprotor system 900 includes a yoke 902 depicted as having an inboard pocket 904 and a pair of hub bolt openings (not visible) inboard of inboard pocket 904 each having a bushing secured therein. A bearing assembly 910 is disposed in inboard pocket 904 of yoke 902. Bearing assembly 910 includes a centrifugal force bearing 912, a shear bearing 914, an inboard beam 916 and a bearing cage 918. In the illustrated embodiment, inboard beam 916 includes a cavity 916a that is preferably permanently coupled to an elastomer element of shear bearing 914 by vulcanizing, bonding, adhering or otherwise securing the elastomeric material to the inner surface of cavity 916a.

In the illustrated embodiment, bearing cage 918 includes upper clamp plate 918a, spindle 918b, bearing retainer 918c and lower clamp plate 918d. Bearing retainer 918c has an anti-rotation coupling with centrifugal force bearing 912. In the illustrated embodiment, screws 920 extend between bearing retainer 918c and an outboard metal housing 912a of centrifugal force bearing 912 to prevent relative rotation and lateral movements therebetween. In the illustrated embodiment, spindle 918b passes through and is operable to allow relative rotation thereabout by centrifugal force bearing 912 and shear bearing 914. Upper clamp plate 918a and a lower clamp plate 918d are coupled together by bearing bolts 922a, 922b. Upper and lower clamp plates 918a, 918b are coupled to yoke 902 by hub bolts 924a, 924b. As described above, hub bolts 924a, 924b have been foreshortened for convenience of illustration as hub bolts 924a, 924b would also coupled the constant velocity joint to yoke 902. Importantly, an outboard surface 918e of bearing retainer 918c has a space apart relationship with an outboard surface 904a of inboard pocket 904 when upper and lower clamp plate 918a, 918b have the clamped relationship with yoke 902. The space apart relationship prevents centrifugal force load transfer between outboard surface 918e of bearing retainer 918c and outboard surface 904a of inboard pocket 904. Instead, hub bolts 924a, 924b provide centrifugal force load paths between bearing assembly 910 and yoke 902.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A proprotor system for a tiltrotor aircraft having a helicopter flight mode and an airplane flight mode, the proprotor system comprising:
    a yoke having a plurality of blade arms including a first blade arm having an inboard pocket;
    a bearing assembly disposed at least partially within the inboard pocket, the bearing assembly including a centrifugal force bearing and a shear bearing;
    an inboard beam disposed at least partially between the centrifugal force bearing and the shear bearing;
    a proprotor blade coupled to the inboard beam; and
    a latch assembly selectively coupling the bearing assembly to the yoke, the latch assembly rotatable relative to the yoke between engaged and disengaged positions;
    wherein, in the engaged position, the latch assembly is engaged with the bearing assembly to couple the bearing assembly to the yoke; and
    wherein, in the disengaged position, the latch assembly is disengaged from the bearing assembly enabling installation and removal of the bearing assembly relative to the inboard pocket.

2. The proprotor system as recited in claim 1 wherein the yoke further comprises first and second surfaces and wherein the first blade arm defines a pair of hub bolt openings passing through the yoke inboard of the inboard pocket.

3. The proprotor system as recited in claim 2 further comprising a flange coupled to the shear bearing and having a pair of bearing bolt openings, the flange having a contact relationship with the first surface of the yoke.

4. The proprotor system as recited in claim 3 wherein the latch assembly further comprises a clamp plate coupled to the second surface of the yoke and a pair of cam latches each coupled to and rotatable relative to the first surface of the yoke.

5. The proprotor system as recited in claim 4 wherein, in the engaged position, each cam latch and the clamp plate is coupled to the flange.

6. The proprotor system as recited in claim 4 wherein the clamp plate has a pair of hub bolt openings and a pair of bearing bolt openings, wherein the flange has a pair of bearing bolt openings and wherein each cam latch has a hub bolt opening and a bearing bolt opening.

7. The proprotor system as recited in claim 6 further comprising first and second hub bolts each passing through aligned hub bolt openings of one of the cam latches, the yoke and the clamp plate to couple the latch assembly to the yoke.

8. The proprotor system as recited in claim 7 wherein each cam latch is rotatable about one of the hub bolts between the engaged and disengaged positions enabling, in the disengaged position, installation and removal of the bearing assembly relative to the inboard pocket without removal of the hub bolts.

9. The proprotor system as recited in claim 6 further comprising first and second bearing bolts each passing through aligned bearing bolt openings of one of the cam latches, the flange and the clamp plate to couple the bearing assembly to the yoke when the latch assembly is in the engaged position.

10. The proprotor system as recited in claim 1 wherein, the centrifugal force bearing is positioned outboard of the shear bearing.

11. The proprotor system as recited in claim 1 wherein, the centrifugal force bearing further comprises a series of spherical elastomeric layers separated by inelastic shims.

12. The proprotor system as recited in claim 1 wherein, the shear bearing further comprises:
    a radially inwardly disposed journal bearing coupled to the inboard beam; and
    a radially outwardly disposed spherical bearing providing a tilting degree of freedom for the inboard beam relative to the yoke.

13. The proprotor system as recited in claim 1 wherein the plurality of blade arms further comprises at least three blade arms.

14. A proprotor system for a tiltrotor aircraft having a helicopter flight mode and an airplane flight mode, the proprotor system comprising:
    a yoke having a plurality of blade arms including a first blade arm having an inboard pocket;

first and second of hub bolts extending through the yoke inboard of the inboard pocket;

a bearing assembly disposed at least partially within the inboard pocket, the bearing assembly including a centrifugal force bearing and a shear bearing having a flange;

an inboard beam disposed at least partially between the centrifugal force bearing and the shear bearing;

a proprotor blade coupled to the inboard beam; and a latch assembly including a clamp plate coupled to a first side of the yoke and a pair of cam latches coupled to a second side yoke by the first and second hub bolts, each cam latch selectively rotatable relative to the yoke about one of the hub bolts between engaged and disengaged positions;

wherein, in the engaged position, each cam latch is coupled to the flange of the shear bearing and the clamp plate to couple the bearing assembly to the yoke; and wherein, in the disengaged position, each cam latch is uncoupled from the flange enabling installation and removal of the bearing assembly relative to the inboard pocket without removal of the first and second hub bolts.

15. The proprotor system as recited in claim 14 wherein the clamp plate has a pair of hub bolt openings and a pair of bearing bolt openings, wherein the flange has a pair of bearing bolt openings and wherein each cam latch has a hub bolt opening and a bearing bolt opening.

16. The proprotor system as recited in claim 15 wherein each of the hub bolts pass through aligned hub bolt openings of one of the cam latches, the yoke and the clamp plate to couple the latch assembly to the yoke.

17. The proprotor system as recited in claim 16 further comprising first and second bearing bolts each passing through aligned bearing bolt openings of one of the cam latches, the flange and the clamp plate to couple the bearing assembly to the yoke when the latch assembly is in the engaged position.

18. The proprotor system as recited in claim 14 wherein, the centrifugal force bearing is positioned outboard of the shear bearing.

19. The proprotor system as recited in claim 14 wherein, the centrifugal force bearing further comprises a series of spherical elastomeric layers separated by inelastic shims and the shear bearing further comprises a radially inwardly disposed journal bearing coupled to the inboard beam and a radially outwardly disposed spherical bearing providing a tilting degree of freedom for the inboard beam relative to the yoke.

20. A tiltrotor aircraft having a helicopter flight mode and an airplane flight mode, the tiltrotor aircraft comprising:

a fuselage;

a wing extending from the fuselage;

first and second pylon assemblies coupled to the wing outboard of the fuselage; and first and second proprotor systems operably associated respectively with the first and second pylon assemblies, each proprotor system including:

a yoke having a plurality of blade arms including a first blade arm having an inboard pocket;

a bearing assembly disposed at least partially within the inboard pocket, the bearing assembly including a centrifugal force bearing and a shear bearing;

an inboard beam disposed at least partially between the centrifugal force bearing and the shear bearing;

a proprotor blade coupled to the inboard beam; and a latch assembly selectively coupling the bearing assembly to the yoke, the latch assembly rotatable relative to the yoke between engaged and disengaged positions;

wherein, in the engaged position, the latch assembly is engaged with the bearing assembly to couple the bearing assembly to the yoke; and wherein, in the disengaged position, the latch assembly is disengaged from the bearing assembly enabling installation and removal of the bearing assembly relative to the inboard pocket.

\* \* \* \* \*